United States Patent
Lamb et al.

(10) Patent No.: US 12,346,110 B2
(45) Date of Patent: Jul. 1, 2025

(54) CONTROLLABLE LATENT SPACE DISCOVERY USING MULTI-STEP INVERSE MODEL

(71) Applicant: Microsoft Technology Licensing, LLC, Redmond, WA (US)

(72) Inventors: Alexander Matthew Lamb, Redmond, WA (US); Riashat Islam, Redmond, WA (US); Jonatan Efroni, Redmond, WA (US); Dipendra Kumar Misra, Redmond, WA (US); Dylan J. Foster, Redmond, WA (US); Olalekan Patrick Ogunmolu, Redmond, WA (US); Rajan N. Chari, Redmond, WA (US); Akshay Hall-Krishnamurthy, Redmond, WA (US); John Carol Langford, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 351 days.

(21) Appl. No.: 17/981,091

(22) Filed: Nov. 4, 2022

(65) Prior Publication Data
US 2024/0028034 A1   Jan. 25, 2024

Related U.S. Application Data

(60) Provisional application No. 63/389,252, filed on Jul. 14, 2022.

(51) Int. Cl.
*G05D 1/00* (2024.01)
*G06N 3/0455* (2023.01)
(Continued)

(52) U.S. Cl.
CPC ......... *G05D 1/0088* (2013.01); *G06N 3/0455* (2023.01); *G06N 3/08* (2013.01); *G06N 7/01* (2023.01)

(58) Field of Classification Search
CPC ...... G05D 1/0088; G06N 3/0455; G06N 7/01; G06N 3/08
See application file for complete search history.

(56) References Cited

U.S. PATENT DOCUMENTS 11,537,134 B1 * 12/2022 Wiest .................. G06N 3/0455
11,580,429 B2 *  2/2023 Li ......................... G06N 3/006
(Continued)

OTHER PUBLICATIONS

Alemi, et al., "Deep Variational Information Bottleneck", In Proceedings of the International Conference on Learning Representations, Apr. 24, 2017, pp. 1-19.
(Continued)

*Primary Examiner* — Peter D Nolan
*Assistant Examiner* — Wae L Louie
(74) *Attorney, Agent, or Firm* — Schwegman Lundberg & Woessner, P.A.

(57) ABSTRACT

Generally discussed herein are devices, systems, and methods for determining a minimal controllable latent state and operating a model trained to implement the minimal controllable latent state. A method can include receiving first and second observations of a temporal series of observations produced by a sensor, the second observation separated from the first observation by more than one other observation, the first observation associated with a first action performed by an agent responsive to the first observation, encoding, by an encoder, the first and second observations into respective first and second hidden state representations, combining the first and second hidden state representations resulting in a combined representation, operating, by an action predictor, on the combined representation resulting in a second action,
(Continued)

and altering weights of the encoder and the action predictor based on a difference between the first and second actions.

20 Claims, 10 Drawing Sheets

(51) Int. Cl.
  *G06N 3/08* (2023.01)
  *G06N 7/01* (2023.01)

(56) References Cited

U.S. PATENT DOCUMENTS

| | | | |
|---|---|---|---|
| 2016/0096270 A1* | 4/2016 | Ibarz Gabardos | B25J 9/0081 901/3 |
| 2021/0173395 A1* | 6/2021 | Das | G06V 10/776 |
| 2022/0036186 A1* | 2/2022 | Refaat | G06N 3/088 |
| 2022/0075388 A1* | 3/2022 | Magzimof | G05D 1/0027 |
| 2022/0126878 A1* | 4/2022 | Moustafa | B60W 50/16 |
| 2022/0297290 A1* | 9/2022 | Berkenkamp | B25J 9/163 |
| 2022/0318678 A1* | 10/2022 | Kranski | G06N 7/01 |
| 2022/0413502 A1* | 12/2022 | Keski-Valkama | G05D 1/0214 |
| 2023/0073326 A1* | 3/2023 | Schrittwieser | G06F 18/214 |
| 2023/0083486 A1* | 3/2023 | Guo | G06N 3/084 706/21 |
| 2023/0153388 A1* | 5/2023 | Barbieri | G06N 3/045 706/45 |
| 2024/0028034 A1* | 1/2024 | Lamb | G05D 1/0088 |
| 2024/0311616 A1* | 9/2024 | Donderici | G07C 5/0808 |
| 2024/0412114 A1* | 12/2024 | Neumann | A63B 24/0075 |

OTHER PUBLICATIONS

Bharadhwaj, et al., "Information Prioritization through Empowerment in Visual Model-Based RL", In Repository of arXiv:2204.08585v1, Apr. 18, 2022, pp. 1-21.
Cadena, et al., "Past, Present, and Future of Simultaneous Localization and Mapping: Toward the Robust-Perception Age", In Journal of IEEE Transactions on Robotics, vol. 32, Issue 6, Dec. 2016, pp. 1309-1332.
Chang, et al., "Matterport3D: Learning from RGB-D Data in Indoor Environments", In Proceedings of the International Conference on 3d Vision, Sep. 18, 2017, 25 Pages.
Dissanayake, et al., "A Solution to the Simultaneous Localization and Map Building (SLAM) Problem", In Proceedings of IEEE Transactions on Robotics and Automation, vol. 17, Issue 3, Jun. 2001, pp. 229-241.
Du, et al., "Provably efficient RL with Rich Observations via Latent State Decoding", In Proceedings of the 36th International Conference on Machine Learning, May 24, 2019, pp. 1665-1674.
Durrant-Whyte, et al., "Simultaneous Localization and Mapping: Part I", In IEEE Robotics & Automation Magazine, vol. 13, Issue 2, Jun. 2006, pp. 99-108.
Efroni, et al., "Provable RL with Exogenous Distractors via Multistep Inverse Dynamics", In Proceedings of International Conference on Learning Representations, Sep. 19, 2021, pp. 1-11.
Efroni, et al., "Sparsity in Partially Controllable Linear Systems", In Proceedings of International Conference on Machine Learning, Jun. 28, 2022, 10 Pages.
Goodfellow, et al., "Deep Learning", In Publication of MIT Press, Nov. 18, 2016, pp. 351-354.
Hendrycks, et al., "Gaussian Error Linear Units (GELUs)", In Repository of arXiv:1606.08415v4, Jul. 8, 2020, pp. 1-9.
Hutter, et al., "Uniqueness and Complexity of Inverse MDP Models", In Repository of arXiv:2206.01192v1, Jun. 2, 2022, pp. 1-34.
Kingma, et al., "Adam: A Method for Stochastic Optimization", In Repository of arXiv:1412.6980v9, Jan. 30, 2017, pp. 1-15.
Klyubin, et al., "All Else Being Equal Be Empowered", In Proceedings of European Conference on Artificial Life, Sep. 5, 2005, 10 Pages.
Tolstikhin, et al., "MLP-Mixer: An all-MLP Architecture for Vision", In Advances in Neural Information Processing Systems 34, Dec. 6, 2021, pp. 24261-24272.
Lange, et al., "Autonomous Reinforcement Learning on Raw Visual Input Data in a Real World Application", In Proceedings of the International Joint Conference on Neural Networks, Jun. 10, 2012, 8 Pages.
Lecun, et al., "Deep Learning", In Journal of Nature, vol. 521, May 28, 2015, pp. 436-444.
Levin, et al., "Markov Chains and Mixing Times, Second Edition", In Journal of American Mathematical Society, Oct. 31, 2017, 461 Pages.
Watter, et al., "Embed to Control: A Locally Linear Latent Dynamics Model for Control from Raw Images", In Advances in Neural Information Processing Systems 28, Dec. 7, 2015, 9 Pages.
Mazoure, et al., "Deep Reinforcement and InfoMax Learning", In Proceedings of the 34th Conference on Neural Information Processing Systems, 2020, 13 Pages.
Misra, et al., "Kinematic State Abstraction and Provably Efficient Rich-Observation Reinforcement Learning", In Proceedings of International Conference on Machine Learning, Nov. 21, 2020, 11 Pages.
Mnih, et al., "Recurrent Models of Visual Attention", In Proceedings of Annual Conference on Neural Information Processing Systems, Dec. 8, 2014, 9 Pages.
Oord, et al., "Neural Discrete Representation Learning", In Proceedings of the 31st International Conference on Neural Information Processing Systems, Dec. 4, 2017, pp. 1-10.
Oudeyer, et al., "What is Intrinsic Motivation? A Typology of Computational Approaches", In Journal of Frontiers in Neurorobotics, Nov. 2007, pp. 1-14.
Pathak, et al., "Curiosity-driven Exploration by Self-supervised Prediction", In Proceedings of International Conference on Machine Learning, Jul. 17, 2017, 10 Pages.
Dosovitskiy, et al., "An Image is Worth 16×16 Words: Transformers for Image Recognition at Scale", In International Conference on Learning Representations, Jun. 3, 2021, 21 Pages.
Song, et al., "Comparison of Co-expression Measures: Mutual Information, Correlation, and Model based Indices", In Journal of BMC Bioinformatics, vol. 13, Issue 1, Dec. 9, 2012, 21 Pages.
Stadie, et al., "Incentivizing Exploration in Reinforcement Learning with Deep Predictive Models", In Repository of arXiv:1507.00814v3, Nov. 19, 2015, pp. 1-11.
Wahlstrom, et al., "From Pixels to Torques: Policy Learning with Deep Dynamical Models", In Repository of arXiv:1502.02251v3, Jun. 18, 2015, 9 Pages.
Yu, et al., "Unsupervised Visuomotor Control through Distributional Planning Networks", In Repository of arXiv:1902.05542v1, Feb. 14, 2019, 12 Pages.
Zhang, et al., "Learning Invariant Representations for Reinforcement Learning Without Reconstruction", In Repository of arXiv:2006.10742v2, Apr. 7, 2021, pp. 1-16.
Efroni, et al., "Sample-Efficient Reinforcement Learning in the Presence of Exogenous Information", In Repository of arXiv:2206.04282v1, Jun. 9, 2022, 56 Pages.
Baker, et al., "Video PreTraining (VPT): Learning to Act by Watching Unlabeled Online Videos", In Repository of arXiv:2206.11795v1, Jun. 23, 2022, 34 Pages.
Hafner, et al., "Mastering Atari with Discrete World Models", In Repository of arXiv:2010.02193v4, Feb. 12, 2022, pp. 1-26.
"[4K UHD] Colors of Nature", Retrieved from: https://www.youtube.com/watch?v=zRpazyH1Wzl, Jul. 18, 2020, 3 Pages.
Agarwal, et al., "FLAMBE: Structural Complexity and Representation Learning of Low Rank MDPs", In Advances in Neural Information Processing Systems 33: Annual Conference on Neural Information Processing Systems, Dec. 6, 2020, 13 Pages.
Jang, et al., "Categorical Reparameterization with Gumbel-Softmax" In Proceedings of the 5th International Conference on Learning Representations, Apr. 24, 2017, 12 Pages.
Mohamed, et al., "Variational Information Maximisation for Intrinsically Motivated Reinforcement Learning", In Annual Conference on Neural Information Processing Systems, Dec. 7, 2015, 9 Pages.

(56) References Cited

OTHER PUBLICATIONS

Rakelly, et al., "Which Mutual-Information Representation Learning Objectives are Sufficient for Control?", In Advances in Neural Information Processing Systems, vol. 34, Dec. 6, 2021, 13 Pages.
Schwarzer, et al., "Data-Efficient Reinforcement Learning with Self-Predictive Representations", In Proceedings of the 9th International Conference on Learning Representations, May 3, 2021, 18 Pages.
Vaswani, et al., "Attention Is All You Need", In Advances in Neural Information Processing Systems, Dec. 4, 2017, 11 Pages.
Lamb, et al., "Guaranteed Discovery of Controllable Latent States with Multi-Step Inverse Models", In Repository of arXiv:2207.08229v1, Jul. 17, 2022, 26 Pages.
Paster, et al., "Planning from Pixels using Inverse Dynamics Models", In Repository of arXiv:2012.02419v1, Dec. 4, 2020, 18 Pages.
"International Search Report and Written Opinion Issued in PCT Application No. PCT/US23/024635", Mailed Date: Sep. 1, 2023, 13 Pages.

* cited by examiner

CONTROLLABLE LATENT SPACE DISCOVERY USING MULTI-STEP INVERSE MODEL

CROSS-REFERENCE TO RELATED APPLICATIONS

This application claims the benefit of U.S. Provisional Application No. 63/389,252, filed Jul. 14, 2022, entitled "CONTROLLABLE LATENT SPACE DISCOVERY USING MULTI-STEP INVERSE MODEL," which is incorporated herein by reference in its entirety.

BACKGROUND

One-step inverse models are very popular, including a recent work by OpenAI called video pre-training (VPT). VPT fails to capture a complete, controllable latent state. Models which predict the entire observation space, such as a Dreamer model from Google LLC, capture information which includes control, but also capture information that is unrelated to control. To the knowledge of the inventors, there are no currently known techniques that have a general theoretical guarantee to discover a minimal controllable latent state.

SUMMARY

A device, system, method, and computer-readable medium configured for determining a minimal controllable latent state and operating a model trained to implement the minimal controllable latent state. The minimal controllable latent state can be learned using a multi-step inverse model. The multi-step inverse model can include an encoder that encodes a series of observations. The encoded observations can be provided to an action predictor such that consecutive observations are separated by a specified number of observations, k, that is greater than or equal to two. The encoded observations, before being provided to the action predictor, can be focused. Focusing the encoded observations can reduce the encoded observations to a minimum controllable latent state.

DETAILED DESCRIPTION

Figure 1:
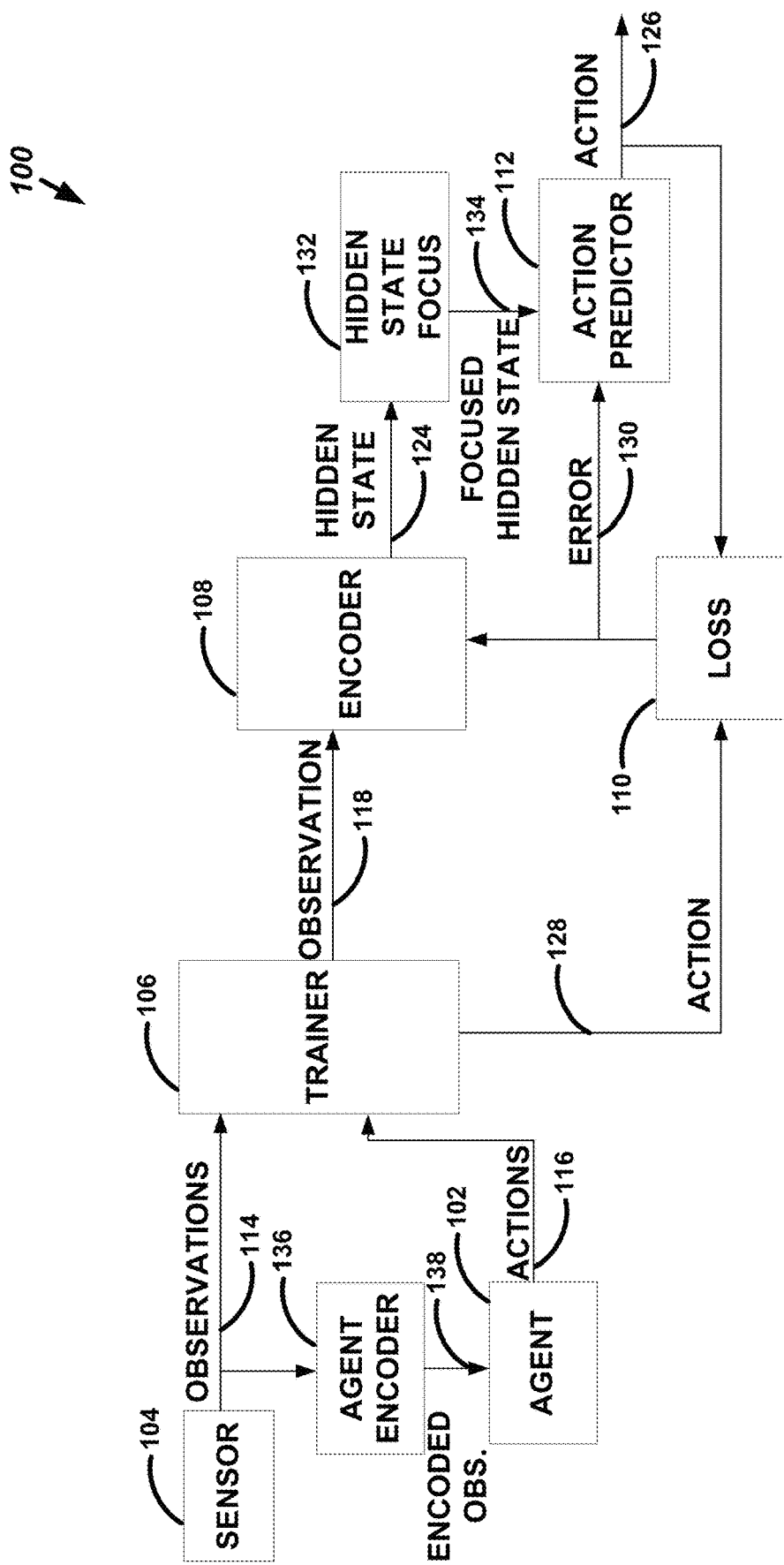
FIG. 1 illustrates, by way of example, a diagram of an embodiment of a system for determining a minimum controllable latent space representation of an agent.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

A person walking along a city street who tries to model all aspects of the world would quickly be overwhelmed by a multitude of shops, cars, and people moving in and out of view, following their own complex and inscrutable dynamics. Exploration and navigation in such an environment is an everyday task, requiring no vast exertion of mental resources. Is it possible to turn this fire hose of sensory information into a minimal latent state which is necessary and sufficient for an agent to successfully act in the world? This question is formulated concretely, and embodiments propose the Agent-Controllable State Discovery algorithm (AC-State), which has theoretical guarantees and is practically demonstrated to discover the minimal controllable latent state which contains all of the information necessary for controlling the agent, while fully discarding all irrelevant information. Embodiments consist of a multi-step inverse model (predicting actions from distant observations (observations more than one time-step away)) with an information bottleneck. AC-State enables localization, exploration, and navigation without reward or demonstrations. The discovery of controllable latent state has been realized in three domains: localizing a robot arm with distractions (e.g., changing lighting conditions and background), exploring in a maze alongside other agents, and navigating in the Matterport house simulator.

Embodiments include a system for learning the dynamics and state of the world which are related to controlling an agent while discarding phenomenon which are not relevant to controlling the agent. The system is fully unsupervised and includes recording or accessing a temporal observation stream (e.g., video, audio, images, or text logs) and the actions of a corresponding temporal stream of actions taken by the agent responsive to respective observations of the temporal observation stream. A model trained in accord with embodiments predict actions from a current observation and one or more future observations (observations greater than one time-step in the future), while the hidden state of the system is kept to a minimum. The discovered latent state (sometimes called a hidden state) can be used to visualize the part of the observation which interacts with the agent while removing irrelevant parts of the observation (such as a background television (TV), background noise, extraneous text or graphics, or changing lighting conditions, a combination thereof, or the like). The actions of the agent may either be taken randomly, taken by a predefined expert agent, or taken by planning in a learned dynamics model. The latter can be used to achieve efficient exploration in noisy environments. The learned dynamics model also enables navigation and control of an agent.

Several scientific fields, ranging from classical mechanics, chemistry and evolution, to subfields of medicine have parsimonious representations for encapsulating how a system (or an agent) interacts with the world. For example, consider a world consisting of a robot arm agent that is manipulating objects using a camera-based sensor. The agent's high-dimensional camera observation contains intertwined information which the agent controls and many distractors from exogenous sources such as lighting conditions. A parsimonious representation enables efficiency for many applications by capturing information such as the joint angles between the arm's links and excluding visual details unrelated to the agent's dynamics. Controllable latent state is defined as the parsimonious representation which includes only information which either can be changed by the agent (such as an object on the table that can be manipulated by the arm) or information which affects the agent's actions (e.g., an obstacle blocking the robot arm's motion). How can one discover a parsimonious representation of the agent-world interaction capturing only underlying dynamics from observations? The AC-State techniques of embodiments provably guarantee discovery of the controllable latent state from observations, which excludes all aspects of the observations unnecessary for control.

AC-State learns an encoder f that maps a given observation x to the corresponding controllable latent state f(x). This is accomplished by optimizing a novel objective using an expressive model class such as deep neural networks (DNNs). The controllable latent state enables an agent to efficiently localize, explore, and navigate itself within the world. As an example, a household robot vacuum must cover the entire area of the house to provide effective cleaning. This can be accomplished quickly using AC-State. For example, the robot can localize within the controllable latent space using the latent state encoder learned by AC-State, a plan to reach a specific room and cover the floor there, then execute the plan in the real-world. Since the controllable latent state excludes irrelevant noise in the house, such as changes in light conditions during the day, each step of this process is efficient.

Learning controllable latent state can be more formally characterized by considering a discrete-time dynamical system where the observations $x_1, x_2, x_3, \ldots, x_T$ evolve according to the observed dynamics, which we write as the conditional probability distribution: $T(x_{t+1}|x_t, a_t)$. The selection of $a_t$ as a function of $x_t$ is the policy, which can be learned or hand-designed. The latent dynamics can then be factorized as $T(s_{t+1}|s_t, a_t)T(e_{t+1}|e_t)$, where s is the controllable latent state, and e is the exogenous information in the observation space, which is irrelevant for control. Successful discovery of controllable latent state entails only learning a model of $T(s_{t+1}|s_t, a_t)$ and how to encode s, while not learning anything about $T(e_{t+1}|e_t)$ or how to encode e.

Deep learning architectures can be optimized for a wide range of differentiable objective functions. A question that is not yet answered is: what is an objective for provably learning controllable latent state which is compatible with deep learning? At issue is finding parsimonious representations which are sufficient for control of a dynamical system given observations from rich sensors (such as high-resolution videos) while discarding irrelevant details. Approaches such as optimal state estimation, system identification, and simultaneous localization and mapping achieve parsimonious state estimation for control, yet require more domain expertise and design than is desirable. Previous learning-based approaches fail to capture the full controllable latent state or fail to exclude all irrelevant information. Reinforcement learning approaches that employ autoencoders or contrastive learning to capture the latent state from rich sensors often capture noise components1. In contrast, approaches based on inverse models can fail to capture the full controllable latent dynamics, while combining them with an autoencoder inherits the weaknesses of that approach. Reward-based bisimulation, can filter irrelevant information from the latent state, but is dependent on access to a reward signal. Deep reinforcement learning based on reward optimization often struggles with sample complexity when the reward is sparse and fails completely when the reward is absent.

The controllable latent state should preserve information about the interaction between states and actions while discarding irrelevant details. The proposed objective (AC-State) accomplishes this by generalizing one-step inverse dynamics to multiple steps with an information bottleneck:

$$\mathcal{L}_{AC-State}(f) = - \mathop{\mathbb{E}}_{t \sim U(0,T)} \left[ \mathop{\mathbb{E}}_{k \sim U(1,K)} \log(\mathbb{P}(a_t|f(x_t), f(x_{t+k}), k)) \right] \quad \text{Eq. 1}$$

$$G = \arg\min_{f \in \mathcal{F}} \mathcal{L}_{AC-State}(f) \quad \text{Eq. 2}$$

$$\hat{f} \in \arg\min_{f \in G} \text{Range}(f) \quad \text{Eq. 3}$$

The parameters of an encoder model are optimized as f: $\mathbb{R}^n \to \{1, \ldots, \text{Range}(f)\}$ which maps from an n-dimensional continuous observation to a finite latent state with output range of size Range(f), an integer number. The set $\mathcal{F}$ represents all mappings achievable by the model. The multi-step inverse objective $\mathcal{L}_{AC-State}$ predicts the action $\alpha_t$ from the observation just before the action $\alpha_t$ is taken and an observation collected k steps in the future. The action step t can be sampled (e.g., uniformly) over all of the T collected samples while the prediction horizon k is sampled (e.g., uniformly) from 1 to K.

The controllable latent state is guaranteed to be one of the optimal solutions for the multi-step inverse objective $\mathcal{L}_{AC-State}$, while other solutions may fail to remove irrelevant information. The controllable latent state is uniquely achievable by also finding the lowest capacity f which minimizes the objective. Embodiments can use two mechanisms to restrict the information capacity in f. The hidden state at the end of the network can be passed through a Gaussian variational information bottleneck. The Gaussian variational information bottleneck reduces the mutual information between x and the representation. Vector quantization can be applied which yields a discrete latent state. While either of these could be used on their own, adding the Gaussian mutual information objective eased discovery of parsimonious discrete representations. In addition to optimizing the objective and restricting capacity, the actions taken by the agent are also important for the success of AC-State, in that they must achieve high coverage of the controllable state space and not depend on the exogenous noise. This is satisfied by a random policy or a policy which depends on $\hat{f}(x_t)$ and achieves high coverage. The AC-State objective enjoys provable asymptotic success in discovering the controllable latent state.

Intuitively, the AC-State objective encourages the latent state to keep information about the long-term effect of actions, which requires storing all information about how the actions affect the world. At the same time, the AC-State objective never requires predicting information about the observations themselves, so it places no value on representing aspects of the world which are unrelated to the agent.

Learning latent states for interactive environments is a mature research area with prolific contributions. A few lines of research and how they fail to achieve guaranteed discovery of controllable latent state are provided. These contributions are categorized into three broad areas based around what they predict: latent state prediction, observation prediction, observation-relationship prediction, and action prediction.

Predicting Latent States: In reinforcement learning, learning latent state representations from high dimensional observations consists in maximizing returns to solve a task. Here, a model predicts latent states such that the pre-trained representations can solve a task. Deep bisimulation approaches learn state representations for control tasks, under agnosticism to task-irrelevant details. An auto-encoder trained with reconstruction loss or a dynamics model, learn low-dimensional state representations to capture information relevant for solving a task.

Although learning latent state representations are shown to be useful to solve tasks, there is no guarantee that such methods can fully recover the underlying controllable latent states. The learnt representations capture both controllable and exogenous parts of the latent state, even though the pre-trained representations can be used to solve a task. In contrast, AC-State fully recovers the controllable states with a theoretical guarantee, while experimental results demonstrate that the underlying controllable latent structure is recovered, with no dependence on exogenous parts of the state.

Predicting Observations: Prior works have learnt generative models or autoencoders to predict future observations for learning latent representations. This is mostly for exploration. An intrinsic reward signal for exploration in complex domains was achieved by training an inverse dynamics model to predict actions while also training a dynamics model to predict future observations. The idea of predicting observations is often referred to as intrinsic motivation to guide the agent towards exploring unseen regions of the state space. Other works use autoencoders to estimate future observations in the feature space for exploration, though such models fail in presence of exogenous observations. Dynamics models learns to predict distributions over future observations predictions, but often for planning a sequence of actions, instead of recovering latent states or for purposes of exploration. Theoretically, prior works have learnt representations based on predictive future observations, such that the learnt representation is useful for exploration; however, a one step predictive dynamics model is provably forced to capture the exogenous noise.

Instead of predicting future observations, AC-State predicts actions based on future observations, and we show that a multi-step inverse dynamics model predicting actions can fully recover the controllable latent states, with no dependence on the exogenous noise. In the presence of exogenous noise, methods based on predictive future observations are prone to predicting both the controllable and exogenous parts of the state space, and do not have guarantees on recovering the latent structure.

Predicting Relation between Observations: By learning to predict relation between two consecutive observations, prior works have attempted at learning latent state representations, both theoretically and empirically. By learning representations exploiting mutual information based objectives (information gain based on current states and actions with future states), previous works have attempted at learning controllable states in presence of exogenous noise. However, unlike AC-State, they learn latent states dependent on exogenous noise, even though the learnt representation can be useful for solving complex tasks. Theoretically, some use a contrastive loss based objective to provably learn latent state representations that can be useful for hard exploration tasks. However, contrastive loss based representations are still prone to exogenous noise, whereas AC-State exploits an exogenous free random rollout policy, with a multi-step inverse dynamics model to provably and experimentally recover the full controllable latent state.

Predicting Actions: AC-State aims at recovering the controllable latent states, by training a multi-step inverse dynamics model in presence of exogenous noise. While prior works have explored similar objectives, either for exploration or for learning state representations, the prior works are unable to recover latent states to perfect accuracy in presence of exogenous noise. The idea of using a simple one step inverse dynamics models have been explored in the past, yet the one step inverse model has counterexamples establishing that it fails to capture the full controllable latent state.

Intuitively, the 1-step inverse model is under-constrained and thus may incorrectly merge distinct states which are far apart in the Markov Decision Process (MDP) but have a similar local structure. As a simple example, suppose there is a chain of states: s1, s2, s3, s4, s5, s6 and a=0 moves earlier in the chain and a=1 moves later in the chain. Suppose s1, s3, s4, s6 are encoded as distinct latent states and s2, s5 are merged to the same latent state, which we may call s*. The inverse-model examples containing s* are: (s1, s*, 1), (s*, s1, 0), (s*, s3, 1), (s3, s*, 0), (s4, s*, 1), (s*, s4, 0), (s*, s6, 1), (s6, s*, 0). Because all of these examples have distinct inputs, 1-step inverse model still has zero error despite the incorrect merger of the states s2 and s5.

Empowerment based objectives focus on the idea that an agent should try to seek out states where it is empowered by having the greatest number of possible states which it can easily reach. For example, in a maze with two rooms, the most empowered state is in the doorway, since it makes it easy to reach either of the rooms. Concrete instantiations of the empowerment objective may involve training models to predict the distribution over actions from observations (either single-step or multi-step inverse models), but lack the information bottleneck term and the requirement of an exogenous-independent rollout policy. The analysis and theory in this work focuses on action-prediction as a particular method for measuring empowerment, rather than as a way of guaranteeing discovery of a minimal controllable latent state and ignoring exogenous noise.

In contrast, AC-State uses a simple multi-step inverse dynamics model, with a random rollout policy, and provably guarantees perfect recovery of only the controllable part of the state space, in presence of exogenous noise, either from other agents acting randomly in the environment, or in presence of background distractors. The simplicity of AC-State to use a simple inverse dynamics model to learn latent states has not been exploited by prior works using dynamics models.

Provable reinforcement learning and control in the presence of exogenous noise. Reinforcement learning problem in the presence of exogenous and irrelevant information has been analyzed. For example, the Ex-BMDP model was designed a provably efficient algorithm that learns the state representation. However, the algorithm succeeds only in the episodic setting, when the initial controllable state is initialized deterministicaly. This strict assumption makes the algorithm impractical in many cases of interest. AC-State removes the determinstic assumption of the initial latent state. Indeed, as theory suggests, AC-State can be applied in the you-only-leave-once setting, when an agent has access to a single trajectory.

Other provable RL algorithms have been designed that efficiently learn in the presence of exogenous noise under different assumptions on the underlying dynamics. These works, however, focused on statistical aspects of the problem; how to scale these approaches to complex environments and combine function approximations is currently unknown and seems challenging. Unlike the aforementioned works, embodiments focus on the representation learning problem. Our goal is to design a practical and guaranteed approach by which we can learn the controllable representation with complex function approximators such as deep neural networks. AC-State, is the first algorithm that achieves this task.

FIG. 1 illustrates, by way of example, a diagram of an embodiment of a system 100 for determining a minimum controllable latent space representation of an agent 102. The minimum controllable latent space is learned jointly by an encoder 108 and an action predictor 112. A sensor 104 provides respective observations 114 to a trainer 106 and an agent encoder 136. The agent encoder 136 can operate to encode the observations 114 resulting in encoded observations 138. The observations 114 can alternatively be retrieved from a dataset (e.g., based on a heuristic or randomly) that stores the observations 114.

The agent 102 performs respective actions 116 based on one or more encoded observations 138 of the observations 114. The actions 116 of the agent 102 are recorded and provided to the trainer 106 or observed and recorded by the trainer 106. The observations 114 and actions 116 can each be associated with respective timestamps. A timestamp can indicate a date and time that an associated observation 114 was generated. A timestamp can indicate a date and time that an associated action was performed. A series of the observations 114 ordered with respect to time is sometimes called a "temporal series of observations". A series of the actions 116 ordered with respect to time is sometimes called a "temporal series of actions".

The temporal series of observations and the temporal series of actions can be aligned with respect to time such that an observation 114 is received by the agent 102 and a corresponding action of the actions 116 is the immediately next action performed by the agent 102 after the corresponding observation 114 is received.

The agent 102 can include a device, system, circuit, electrical implement, mechanical implement, chemical implement, or a combination thereof. The agent 102 is operable to receive the observation 114 and perform the action 116. The observation 114 is an output of the sensor 104. The sensor 104 is a transducer that converts an electromagnetic, mechanical, or chemical input to an electrical signal indicative of a condition being monitored by the sensor 104. The condition can include light, salinity, pH, force, pressure, a gas (e.g., oxygen, carbon dioxide, carbon monoxide, vapor, among many others), conductivity, proximity to another object, movement (e.g., speed, direction, or the like via an accelerometer), orientation (e.g., via a tilt sensor), water content (e.g., via a humidity sensor), human touch, height, geographical location (e.g., via global positioning system (GPS) or the like), among many other possible conditions. The actions 116 can include movement, direction of movement, amount of movement, refraining from acting, capturing an image, starting or stopping a device operation, activating an algorithm, mechanical motion, chemical release or capture, altering a display, among many others. In some embodiments, the sensor 104 and the agent 102 are integrated into a same device and in other embodiments, the sensor 104 and the agent 102 are part of different devices.

The trainer 106 is a compute device that provides a series of selected, respective observations 118 of the observations 114 to the encoder 108. The trainer 106 controls the training process of a joint training of the encoder 108 and the action predictor 112. The trainer 106 provides the observation 118 that is at index J in the temporal series of observations. J is an integer in the range (0, max observation index].

The trainer 106 provides an observation at index J (the observation 118) in a first training iteration, then the trainer provides an observation multiple indices ahead of the observation 118 (the observation at index J+K) in an immediately next iteration. K is an integer greater than one and less than the max observation index. K is the number of indices the observation is ahead of the immediately previous observation 118 in the temporal series of observations. The trainer 106 thus jointly trains the encoder 108 and the action predictor 112 in a multi-step manner (using observations that are multiple steps (e.g., more than one step) apart in the temporal series of observations). An upper bound on K can be defined. In some examples, the upper bound can be defined as a maximum path length of a Markov decision process that models behavior of the agent.

The encoder 108 converts the observation 118 to a lower dimensional space. The output of the encoder 108 is a hidden state 124, which is a vector of a fixed length. The encoder 108 can be implemented using a convolutional neural network (CNN), transformer, or another neural network (NN) construct.

The hidden state 124 can be received by a hidden state focus operator 132. The hidden state focus operator 132 can perform operations, such as a Gaussian variational information bottleneck, vector quantization, another discretization of the hidden state 124, another technique that reduces mutual information between the observation and the hidden state 124, a combination thereof, or the like. A focused hidden state 134 includes the hidden state 124 with non-controllable factors removed from the hidden state 124. The focused hidden state 134 is thus a minimum or near minimum expression of information for the action predictor 112 to determine the action 126.

The action predictor 112 can operate on the focused hidden state 134. The action predictor 112 can include any model capable of receiving and operating on the focused hidden state 134 and generating the action 126. The action predictor 112 can include a decoder NN or other model capable of decoding the action 126 from the focused hidden state 134.

A loss operator 110 can receive an action 128 associated with the observation 118 and the action 126 determined by the action predictor 112. The loss operator 110 can generate an error 130 based on an objective function. The error 130 can be used to adjust weights, parameters or the like of the encoder 108, the action predictor 112, or a combination thereof. The adjustment can be achieved using backpropagation. The objective function can be represented as:

$$\mathcal{L}_{AC\text{-}State}(f) = -\mathbb{E} \log \mathbb{P}(\alpha_t | f(x_t), f(x_{t+k}); k)$$

Where t is the time or index, k is an integer greater than one, x is an observation, and α is an action.

The operations of the hidden state focus operation 132 can operate to make the focused hidden state 134 as small, coarse, or include as little information as possible. This can be represented as G:

$$G = \arg\min_{f \in \mathcal{F}} \mathcal{L}_{AC\text{-}State}(f)$$

More details regarding training and operating the encoder 108 and the action predictor 112 and applications are provided elsewhere.

The result of training with AC-State can be represented by a discrete graph where there is a node for every controllable latent state with edges representing actions leading to a state-action node from which weighted outcome edges lead back to controllable latent state nodes. The probabilities of transitioning from one node to another node can be determined in this controllable latent space by using counts to estimate $T(s_{t+1}|s_t, \alpha_t)$. After this controllable latent state and associated transition distribution is estimated, one can directly measure how correct and how parsimonious these dynamics are whenever the ground-truth controllable latent state is available (which is the case in all of the experiments discussed herein). An error (e.g., an L1, L2, or other error) can be determined on this dynamics distribution as well as the ratio of the number of learned latent states to the number of ground truth controllable states, which we refer to as State Parsimony. Experiments, discussed in more detail elsewhere, explore three domains and demonstrate the unique capabilities of AC-State: (i) AC-State learns the controllable latent state of a real robot from a high-resolution video of the robot with rich temporal background structure (a TV playing a video, flashing lights, dipping birds, and even people) dominating the information in the observed dynamics; (ii) multiple mazes and functionally identical agents where only one agent is controlled. AC-State only learns about the controlled agent while ignoring others, enabling the solution of a hard maze-exploration problem. (iii) AC-State learns controllable latent state in a house navigation environment where the observations are high-resolution images and the camera's vertical position randomly oscillates, showing that AC-State is invariant to exogenous viewpoint noise which radically changes the observation.

Figure 2:
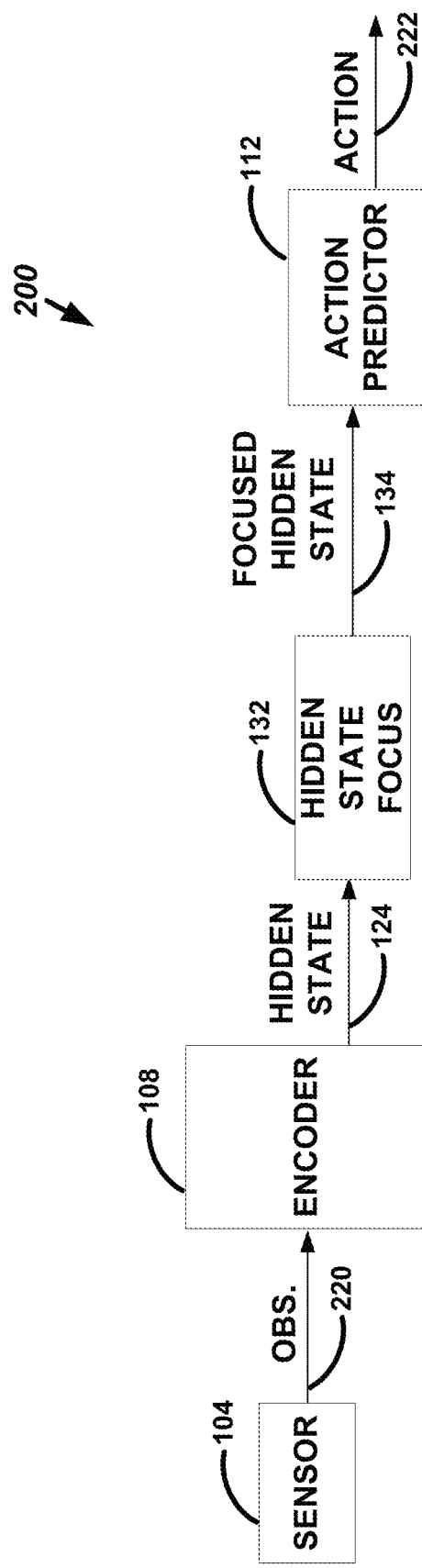
FIG. 2 illustrates, by way of example, a diagram of an embodiment of a system that includes the trained model of the system from FIG. 1 in use.

FIG. 2 illustrates, by way of example, a diagram of an embodiment of a system 200 that includes the trained model of the system 100 from FIG. 1 in use. The trained model includes the encoder 108, hidden state focus operator 132, and the action predictor 112 after training. The system 200 as illustrated includes the sensor 104 that generates another observation 220 after deployment. The encoder 108 and the action predictor 112 are jointly trained to produce an action 222 based on the observation 220. The action 222 is reliably the action 116 that would be taken by the agent 102 responsive to the observation 114. The encoder 108, hidden state focus operator 132, and action predictor 112 can thus be used to replicate the actions 116 of the agent 102. More details regarding possible actions, agents, and other details are provided elsewhere.

Figure 3:
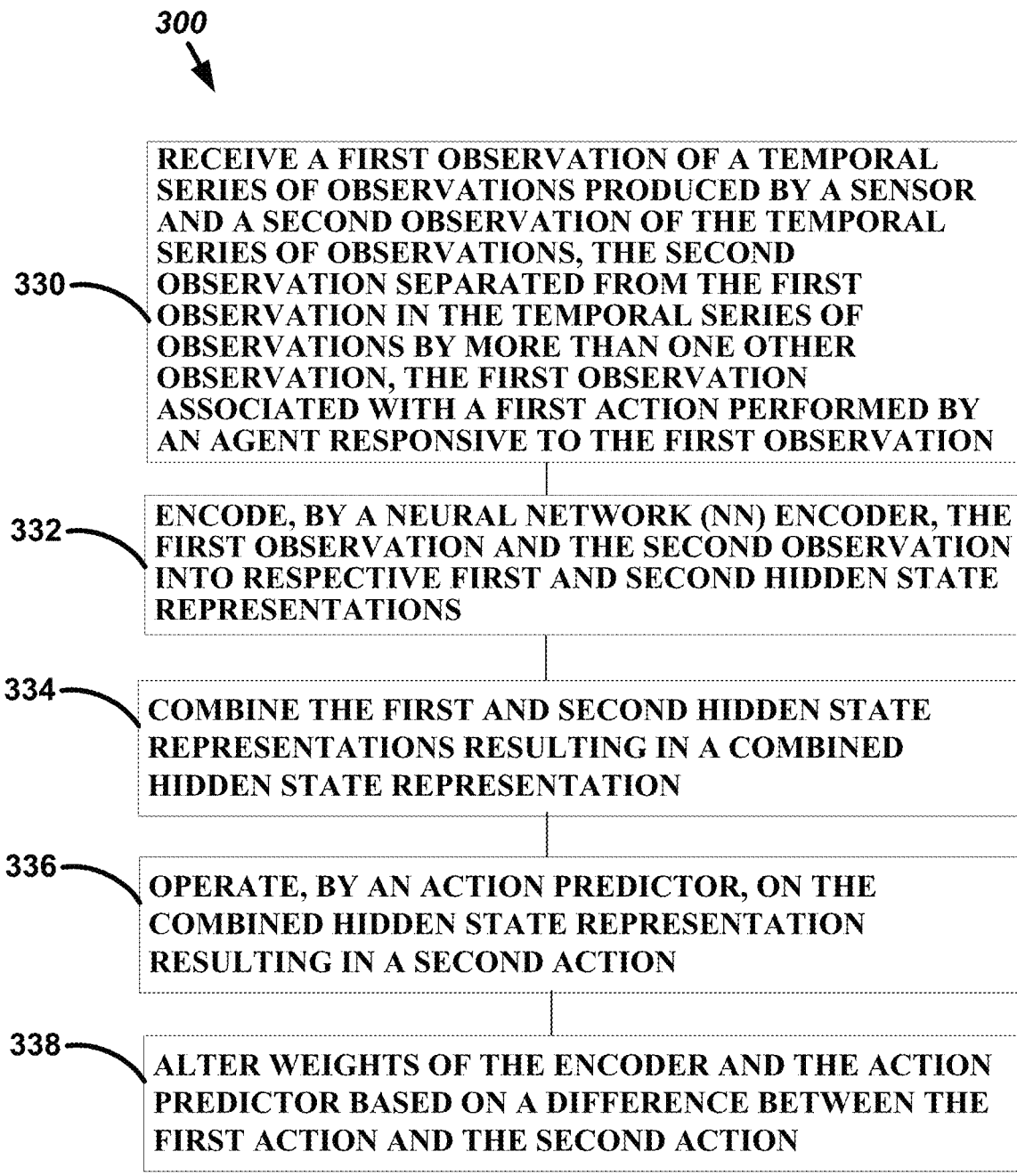
FIG. 3 illustrates, by way of example, a diagram of an embodiment of a method for determining a minimal controllable latent state and/or operating a model trained to implement the minimal controllable latent state.

FIG. 3 illustrates, by way of example, a diagram of an embodiment of a method 300 for determining a minimal controllable latent state and/or operating a model trained to implement the minimal controllable latent state. The method 300 as illustrated includes receiving a first observation of a temporal series of observations produced by a sensor and a second observation of the temporal series of observations, the second observation separated from the first observation in the temporal series of observations by more than one other observation, the first observation associated with a first action performed by an agent responsive to the first observation, at operation 330; encoding, by a neural network (NN) encoder, the first observation and the second observation into respective first and second hidden state representations, at operation 332; combining the first and second hidden state representations resulting in a combined hidden state representation, at operation 334; operating, by an action predictor, on the combined hidden state representation resulting in a second action, at operation 336; and altering weights of the encoder and the action predictor based on a difference between the first action and the second action, at operation 338.

The method 300 can further include altering the hidden state representation to remove information irrelevant to control of the agent resulting in a focused hidden state representation and wherein the action predictor operates on the focused hidden state representation. The method 300 can further include, wherein altering the hidden state representation includes using a Gaussian variational information bottleneck, vector quantization, or a combination thereof. The method 300 can further include, wherein altering the hidden state representation includes using the Gaussian variational information bottleneck and the vector quantization to generate the focused hidden state representation.

The method 300 can further include, wherein altering the weights includes using an objective function that operates based on the first action, the first observation, and the second observation to determine a probability. The method 300 can further include receiving a value, k, indicating a difference between a first index of the first observation and a second index of the second observation in the temporal series of observations. The method 300 can further include between consecutive training iterations, altering k to a different integer. The method 300 can further include, wherein k is varied between two and a maximum path length of a Markov decision process that models behavior of the agent.

AC-State discovers the controllable latent state of a real robot arm, while ignoring distractions. 6 hours of data (14,000 samples) were collected from operation of the robot arm. In the data, the robot arm takes four high level actions (move left, move right, move up, and move down). A picture of the robot arm was taken after each completed action. The robot arm was placed with many distractions, such as a television, flashing, color-changing lights, and people moving in the background. Some of these distractions, (especially the TV) had strong temporal correlation between adjacent time steps, as is often the case in real-life situations.

Figure 4:
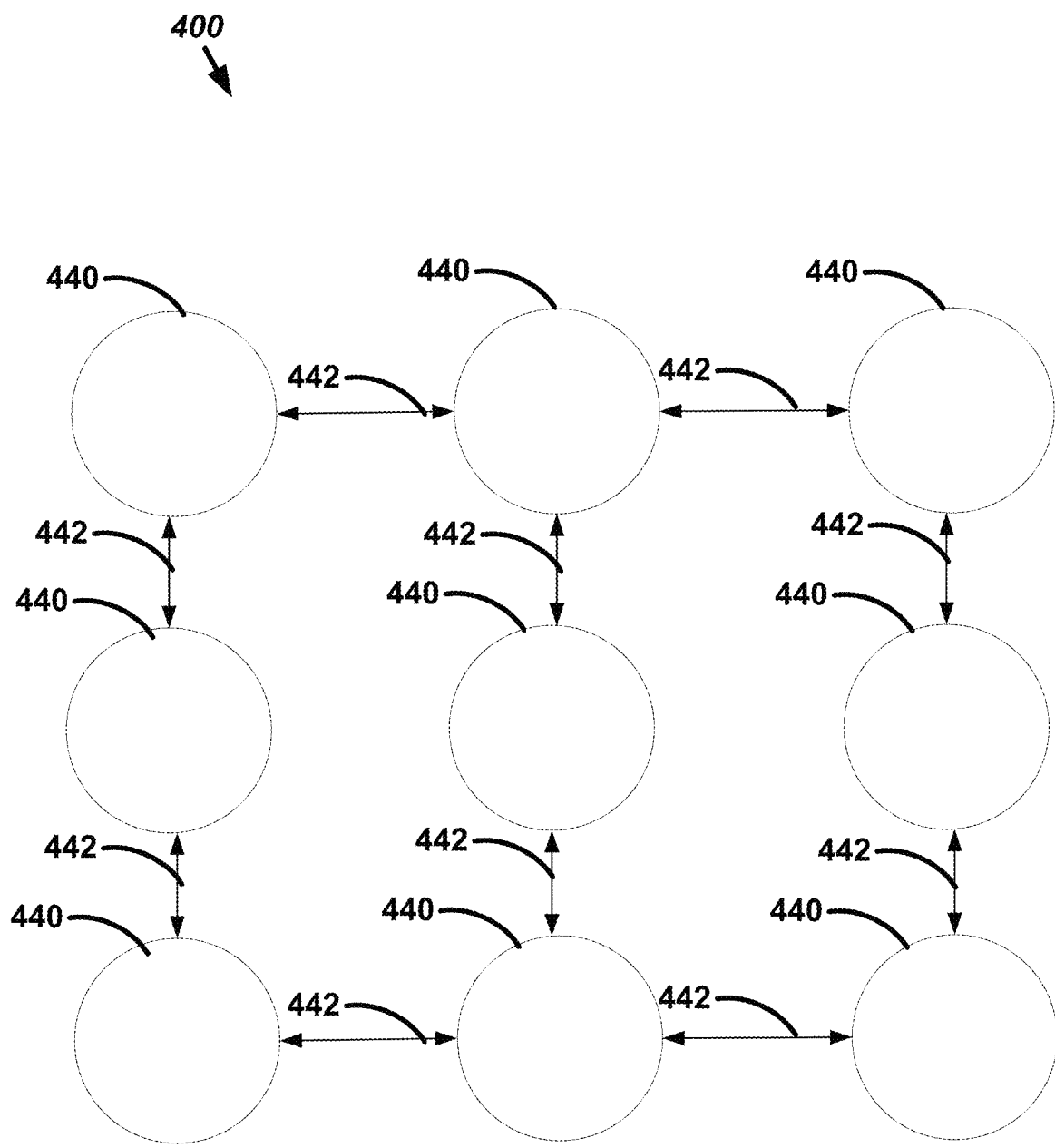
FIG. 4 illustrates, by way of example, a graph that represents a controllable latent state of the robot arm.

FIG. 4 illustrates, by way of example, a graph 400 that represents a controllable latent state of the robot arm. The controllable latent state is the ground truth position of the robot (not used during training). The graph 400 includes nodes 440 that represent locations of the end of the robot arm and edges 442 with arrows represent possible transitions between nodes 440. AC-State was evaluated by training a neural network to reconstruct the latent state x from images of the robot arm in action f(x). The position of the robot arm was perfectly reconstructed using the learned latent space, while the distracting TV and color-changing lights appeared completely blank as expected.

Figure 5:
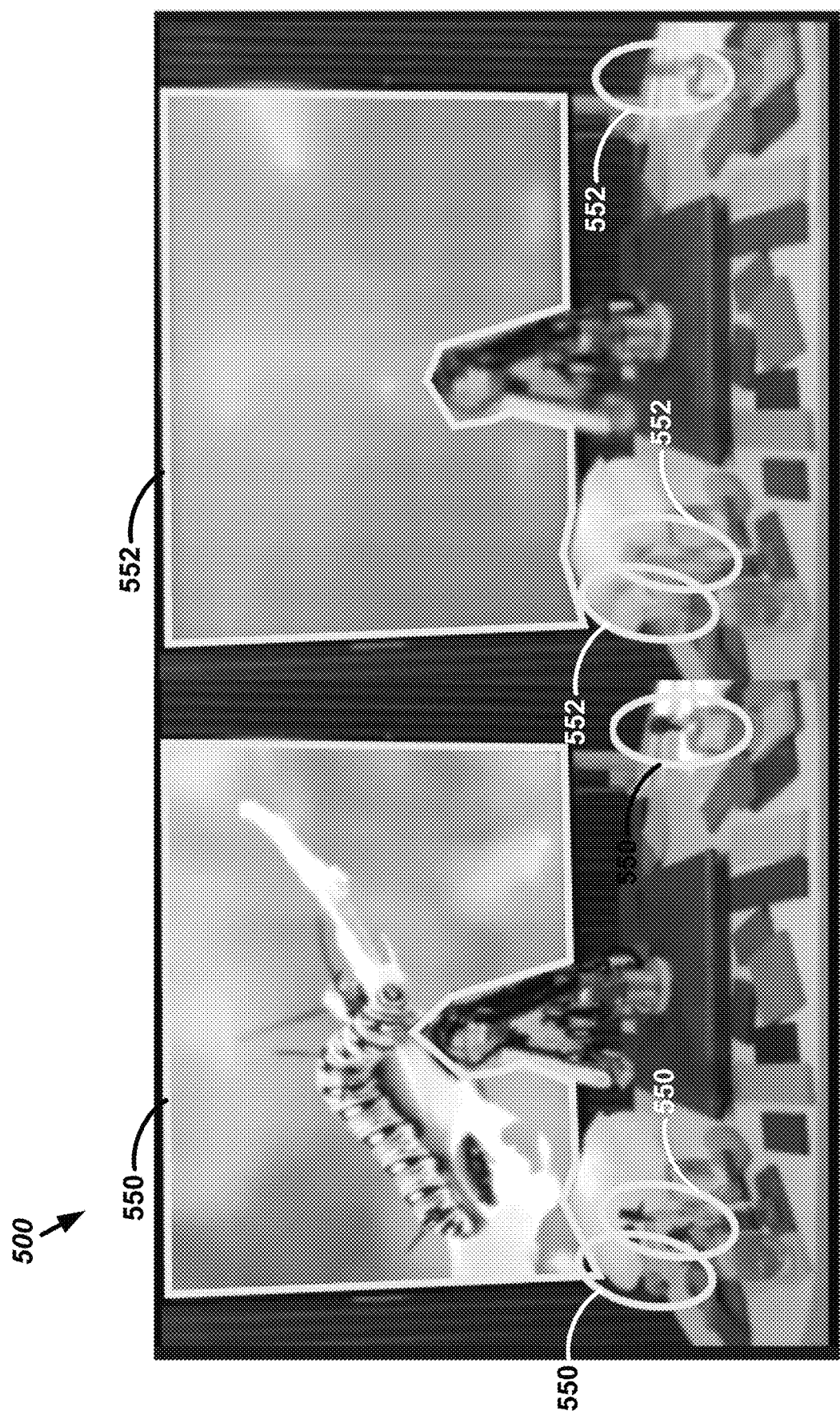
FIG. 5 illustrates the image produced by the network trained using the AC-State.

FIG. 5 illustrates the image produced by the network trained using the AC-State. As can be seen, the items that did not affect the state of the robot arm (items outlined in thick solid lines 550 on the left do not appear in the thick solid lines 552 on the right) including video and objects in motion, were not replicated. Instead, the minimum latent state was retained, with focus on the position of the robot arm.

Figure 6:
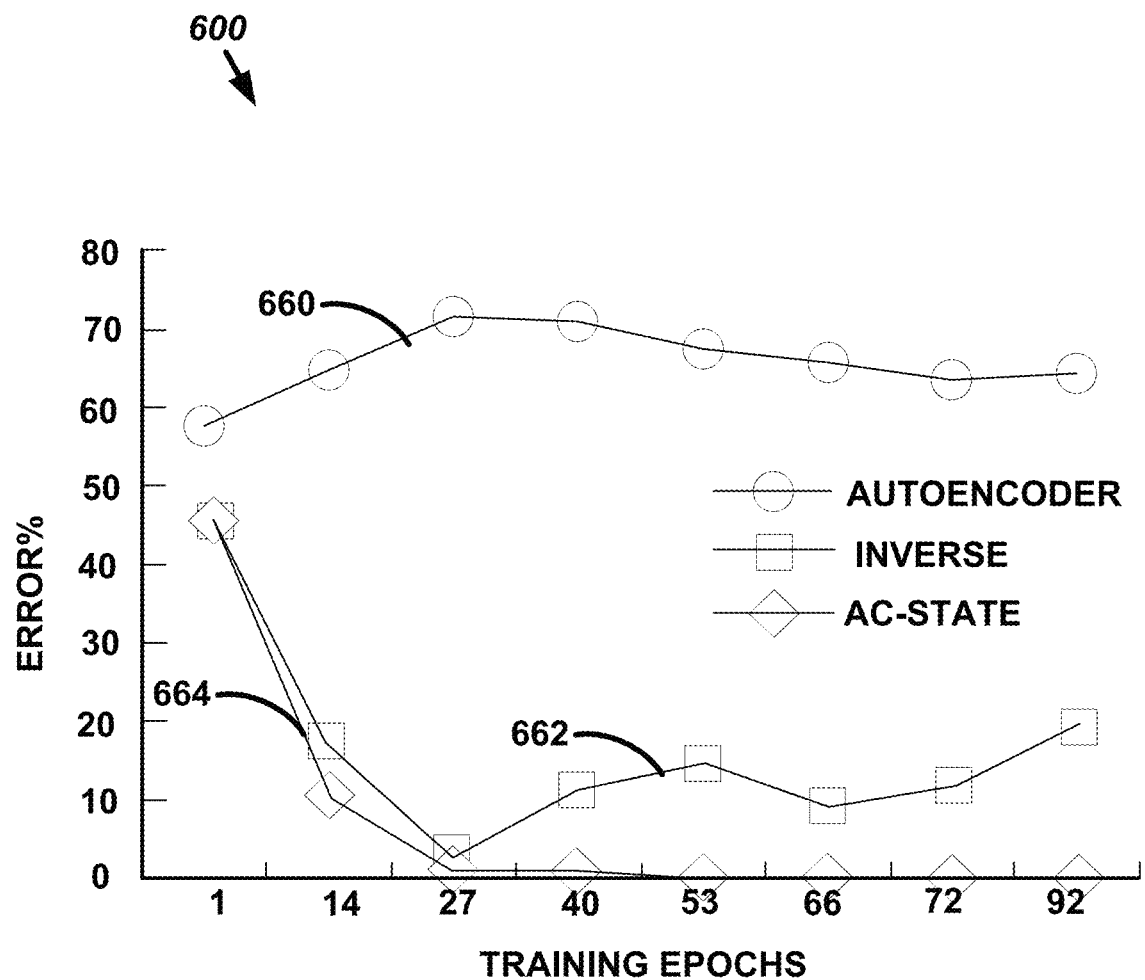
FIG. 6 illustrates, by way of example, a graph of error percentage versus number of training epochs for a variety of networks trained in a variety of manners including an autoencoder, a single-step inverse model, and a network trained using AC-State of embodiments.

FIG. 6 illustrates, by way of example, a graph 600 of error percentage versus number of training epochs for a variety of networks trained in a variety of manners including an autoencoder (represented by line 660), a single-step inverse model (represented by line 662), and a network trained using AC-State (represented by line 664) of embodiments. The auto-encoder was quite inaccurate as it captures both the controllable latent state and the uncontrollable states, such as distractor noise (the items in the solid lines 550). The inverse model was more accurate than the autoencoder, but still suffers from capturing uncontrollable states. The AC-State network learns the controllable latent state and can replicate the robot arm movement nearly perfectly after sufficient number of training epochs.

Using a robot arm with 6 degrees of freedom, with 5 possible abstract actions: forward, reverse, left, right, and stay. The robot arm moves within 9 possible positions in a virtual 3×3 grid, with walls between some cells. The center of each cell is equidistant from adjoining cells. The end-effector is kept at a constant height. Each cell's centroid is computed and a transformation is composed from the joint space of the robot to particular grid cells via standard inverse kinematics calculations. Two cameras are used to take still images. One camera is facing the front of the robot and the other camera is facing down from above the robot. When a command is received, the robot moves from one cell to the another cell center, assuming no wall is present. After each movement, still images (640×480) are taken from two cameras and appended together into one image (1280×480). During training, only the forward facing, down-sampled (256×256) image is used. Each movement takes one second. After every 500 joint space movements, the robot is re-calibrated to the grid to avoid position drift.

Data with the robot arm moving under a uniformly random policy for 6 hours were collected, giving a total of 14000 samples. There were no episodes or state-resets. In addition to the robot, there are several distracting elements in the image. A looped video plays on a large display in high resolution (4K video) at 2× speed. Four drinking toy birds, a color changing lamp and flashing streamer lights are also present. During the last half hour of image collection, the distracting elements are moved and/or removed to simulate additional uncertainty in the environment.

A visualization of the latent state was learned by learning a small convolutional neural network to map from the latent state $f(x_t)$ to an estimate $\hat{x}_t$ the observation $x_t$ by optimizing the mean-square error reconstruction loss $\|\hat{x}-x_t\|^2$.

Figure 7:
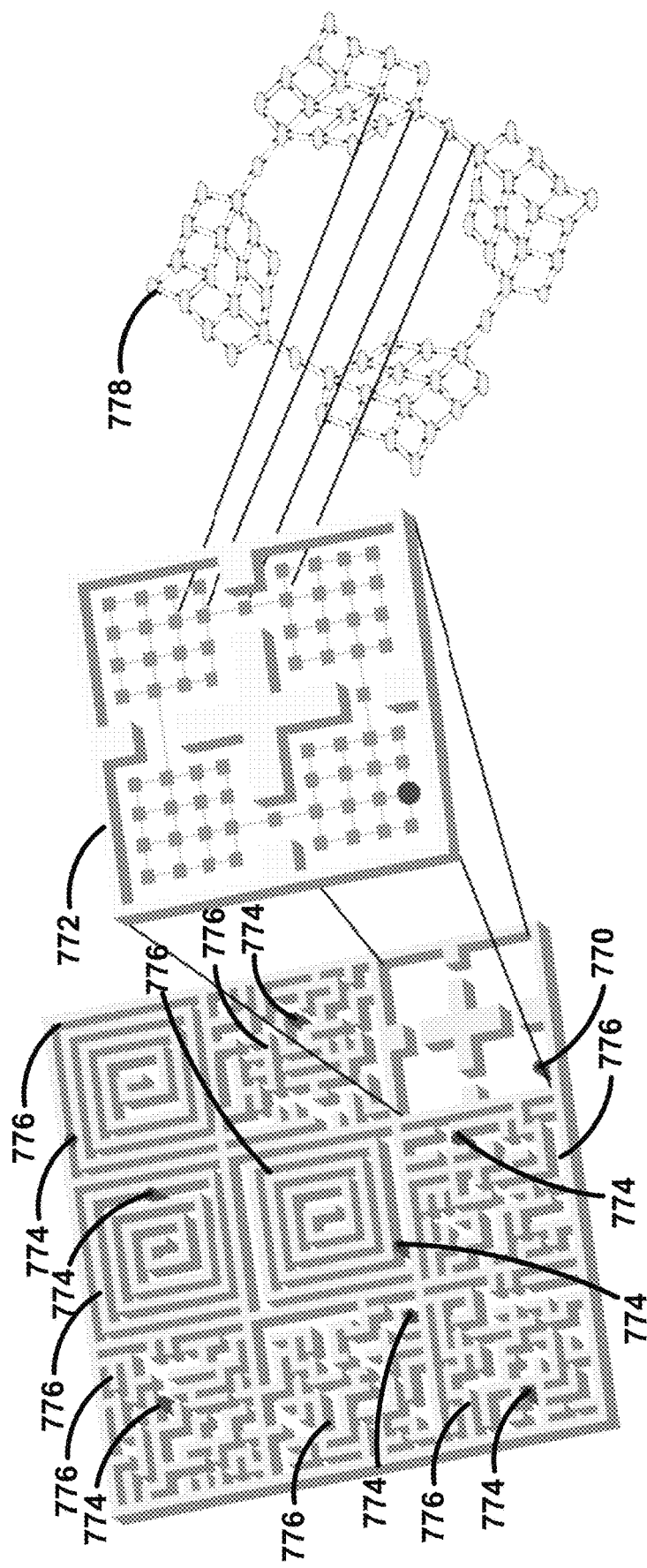
FIG. 7 illustrates, by way of example, a diagram of an embodiment of another experiment for learning the controllable latent state of an object.

FIG. 7 illustrates, by way of example, a diagram of an embodiment of another experiment for learning the controllable latent state of an object. The experiment in the example of FIG. 7 is a multi-agent system where only a single agent of multiple agents has a controllable latent state while the remaining agents are uncontrollable exogenous agents controlled by a random policy. As discussed previously, an auto-encoder trained end-to-end with x as input captures both the controllable latent state and distractor noise. In the experiments herein, AC-State removes exogenous noise in environments, even where that noise has a rich and complex structure. In the particular example of FIG. 7, the agent 770 maneuvering in the path 772 in the lower right corner is the only controllable agent. The other agents 774 follow their own independent policies to navigate their paths 776. The learned controllable latent state 778 perfectly replicates the paths and connections therebetween while ignoring the uncontrollable and exogenous paths 776.

In the example of FIG. 7, nine (9) agents are illustrated with only one agent being controllable. However, embodiments are applicable to more or fewer agents with more or fewer agents being controllable. For 9 agents, where each agent has c controllable states, the overall size of the observation space is $c^9$. With 3,000 training samples, AC-State is able to nearly perfectly discover the controllable latent state of the agent 770, while fully ignoring the state of the eight (8) uncontrollable exogenous agents.

The controllable latent state is useful when it allows for more efficient exploration than is achievable under a random policy. To exhibit this, the modified maze problem of FIG. 7 was used by giving an agent additional actions which reset to a fixed initial starting position. When one-third of all actions cause resets, the probability of acting randomly for N steps without resetting is $(\frac{2}{3})^N$. A learned exploration policy using AC-State succeeds in full exploration and learning of the controllable latent state with 25,000 samples, while a random exploration policy barely explores a first room with a same number of samples.

In the reset experiment, the agent can cause a reset to a fixed starting state, if it picks a reset action. Additionally, a single distracting maze was used as a source of exogenous noise. The goal of this experiment is to show that in presence of reset actions, it is sufficiently hard for a random rollout policy to get full coverage of the mazes. To achieve sufficient coverage one can leverage the discovered controllable latent states to learn a goal seeking policy that can be incentivized to deterministically reach unseen regions of the state space. The counts of the discrete latent states are used to construct a simple tabular Markov Decision Process (MDP) where planning is done to reach goal states using a Monte Carlo version of Djikstra's algorithm (to account for stochastic transition dynamics). The reachable goal states are sampled proportional to $1/\text{count}(s_t)$ so that rarely seen states are the most likely to be selected as goals. Experiment results demonstrate that a goal-seeking policy achieves perfect coverage of the state space by using discovered latent states for exploration, while a random policy fails to reach more than 25% of the state space, in the presence of reset actions.

For comparison, a 2 layer feed forward network (FFN) with 512 hidden units for the encoder network, followed by a vector quantization (VQ-VAE) bottleneck. The use of a VQ-VAE bottleneck discretizes the representation from the multi-step inverse model, by adding a codebook of discrete learnable codes. For recovering controllable latent states from the maze to be control, while ignoring the other exogenous mazes, a MLP-Mixer architecture with gated residual updates was employed. Both the inverse mode and the VQ-VAE bottlenecks are updated using an Adam optimizer with default learning rate 0.0001 without weight decay. The agent can receive either abstract observations or pixel based observations of size 80×80×3. For the multi-maze experiment, the agent receives observation of size 80×720×3 due to the observation from 8 other exogenous agents. The agent has an action space of 4, where actions are picked randomly from a uniform policy. For the reset action setting, we use an additional 4 reset actions, and uniformly picking a reset action can reset it to a deterministic starting state.

To analyze performance of the AC-State objective in a more realistic setting, AC-State was evaluated on Matterport, a navigation environment where each observation is a high resolution image taken from a position in a real house. Navigation through the house is learned from a dataset with 20,000 samples collected from an agent moving randomly through the house. In addition to the high-degree of visual information in the input observations, a camera was moved up or down at each step as a controlled source of irrelevant information (exogenous noise). AC-State removes view noise from the encoded representation f(x) while still capturing the true controllable latent state (FIGS. 8 and 9) whereas other baselines capture both the controllable latent state and the exogenous noise.

The Matterport simulator contains indoor houses in which an agent can navigate. The house contains a finite number of viewpoints which the agent can navigate to. At each viewpoint, the agent has control of its viewing angle (by turning left or right by an angle) and its elevation: in total there are 12 possible viewing angles per viewpoint and 3 possible elevations. Data was collected using a random rollout policy. At each step of the rollout policy, the agent navigates to a neighboring viewpoint. The viewpoint was randomly changed at some of steps of the rollout policy, such as to introduce exogenous information which the agent cannot control. A single long episode of 20,000 state-transitions was collected. The controllable latent state in this setup is the viewpoint information while the exogenous information is the information regarding agent elevation.

The model input is the panorama of the current viewpoint images for the 12 possible views of each viewpoint. The AC-State model f was parameterized using a vision transformer (ViT). Each view within the panorama was fed separately into the ViT as a sequence of patches along with a learnable token called the class (or CLS) following a known procedure. To obtain the viewpoint representation, the representation corresponding to the CLS token of each view was taken along with the mean across all views. The representation was discretized using a VQ-VAE bottleneck to obtain the final representation. A 6-layer transformer with 256 dimensions in the embedding was used. A feedforward network (FFN) after every attention operation in the ViT was used. The FFN is a 2 layer multi-layer perceptron (MLP) with a Gaussian error linear unit (GELU) activation which first projects the input to a higher dimension D and then projects it back to the original dimension. We set the FFN dimension $D_{FFN}$ to 512. 4 heads were used in the ViT. The model was trained for 20 epochs using Adam optimizer with learning rate 1e-4. The model was trained to predict the viewpoint of the next state as the action.

Figures 8, 9:
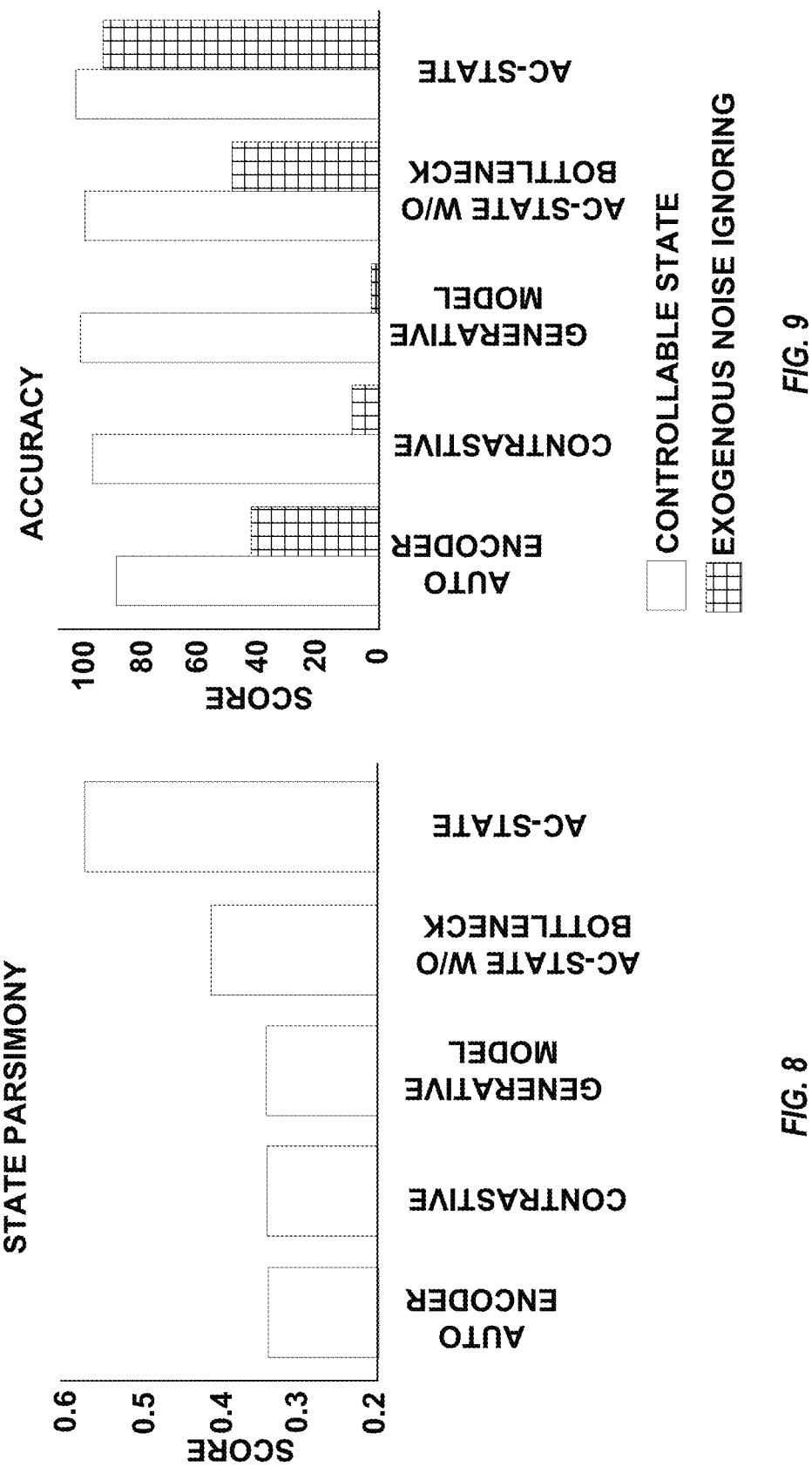
FIG. 8 illustrates, by way of example, a graph of state parsimony score for a variety of machine learning (ML) models.
FIG. 9 illustrates, by way of example, a graph of multiple accuracy measures for a variety of ML models.

FIG. 8 illustrates, by way of example, a graph of state parsimony score for a variety of machine learning (ML) models. As can be seen, for the models illustrated, AC-State with and without an information bottleneck outperform other models shown in terms of state parsimony. AC-State with the information bottleneck has substantially higher state parsimony than AC-State without the information bottleneck.

FIG. 9 illustrates, by way of example, a graph of multiple accuracy measures for a variety of ML models. As can be seen, for the models illustrated, AC-State with and without an information bottleneck perform at least as well as the other models shown in terms of accuracy of a learned controllable latent state. As can be seen, for the models illustrated, AC-State with and without an information bottleneck outperform the other models shown in terms of accuracy of ignoring exogenous noise. AC-State with the information bottleneck has substantially higher accuracy identifying and ignoring exogenous noise than AC-State without the information bottleneck.

The Controllable Latent State Accuracy is the viewpoint prediction accuracy for the current state. The Exogenous Noise-Ignoring Accuracy is calculated as $1-(\varepsilon-33.33)/66.67$, where $\varepsilon$ is elevation prediction accuracy. Thus a higher elevation prediction accuracy leads to a lower the exogenous noise-inducing accuracy. The proposed AC-State model has the highest controllable latent state and exogenous noise-ignoring accuracy. Thus, it outperforms the baselines we considered at capturing Controllable Latent State information while ignoring exogenous noise. State parsimony was calculated as Number of Ground Truth States/Number of Discovered States. Therefore, a lower state parsimony denotes a high number of discovered states which means that the model fails at ignoring exogenous information. The proposed model has the highest state parsimony which shows the effectiveness of the model in ignoring the exogenous noise whilst only capturing controllable latent state.

The experiments show that AC-State reliably discovers controllable latent state across multiple domains. The vast simplification of the controllable latent state discovered by AC-State enables visualization, exact planning, and fast exploration. The field of self-supervised reinforcement learning particularly benefits from these approaches, with AC-State useful across a wide range of applications involving interactive agents as a self-contained module to improve sample efficiency given any task specification. As the richness of sensors and the ubiquity of computing technologies (such as virtual reality, internet of things, and self-driving cars) continues to grow, the capacity to discover agent-controllable latent states enables new classes of applications.

Asymptotic analysis of AC-State shows that AC-State recovers f*, the controllable latent state representation. The mathematical model considered is the deterministic exogenous block Markov Decision Process (Ex-BMDP). With Ex-BMDP, the transition model of the latent state decomposes into a controllable latent state, which evolves deterministically, along with a noise term—the uncontrollable portion of the state. The noise term may be an arbitrary temporally correlated stochastic process. If the reward does not depend on this noise, any optimal policy may be expressed in terms of this controllable latent state. In this sense, the recovered controllable latent state is sufficient for achieving optimal behavior.

Intuitively, the Ex-BMDP is similar to a video game, in which a "game engine" takes player actions and keeps track of an internal game state (the controllable state component), while the visuals and sound are rendered as a function of this compact game state. A modern video game's core state is often orders of magnitude smaller than the overall game. AC-State recovery of the optimal controllable latent state involves (i) an action prediction term; and (ii) a mutual information minimization term. The action prediction term forces the learned representation f̂(x) to capture information about the dynamics of the system. At the same time, this representation for f̂(x) (which is optimal for an action-prediction) may also capture information which is unnecessary for control. In the analysis it is assumed that f̂(x) has discrete values and show the controllable latent state is the unique coarsest solution.

To enable more widespread adoption in deep learning applications, the notion of coarseness is generalized to minimizing mutual information between x and f(x). These are related by a data-processing inequality; coarser representation reduces mutual information with the input. Similarly, the notion of mutual information is general as it does not require discrete representation.

Consider an Exogenous Block Markov Decision Process (Ex-BMDP) setting to model systems with exogenous and irrelevant noise components. First formalize the Block Markov Decision Process (BMDP) model. A BMDP consists of a finite set of observations, X; a set of latent states, $\mathcal{Z}$, with cardinality $\mathcal{Z}$; a finite set of actions, $\mathbb{A}$, with cardinality $\mathcal{A}$; a transition function, T: $\mathcal{Z} \times \mathbb{A} \to \Delta(\mathcal{Z})$; an emission function q: $\mathcal{Z} \to \Delta(X)$; a reward function R: $X \times \mathbb{A} \to [0,1]$; and a start state distribution $\mu_0 \in \Delta(\mathcal{Z})$. The agent interacts with the environment, generating a single trajectory of latent state, observation, and action sequence, $(z_1, x_1, \alpha_1, z_2, x_2, \alpha_2, \ldots)$, where $z_1 \sim \mu(\cdot)$, then $x_t \sim q(\cdot | z_t)$. The agent does not observe the latent states $(z_1, z_2, \ldots)$, instead it receives only the observations $(x_1, x_2, \ldots)$. The block assumption holds if the support of the emission distributions of any two latent states are disjoint, $$\mathrm{supp}(q(\cdot|z_1)) \cap \mathrm{supp}(q(\cdot|z_2)) = \emptyset \text{ when } z_1 \neq z_2$$

where $\mathrm{supp}(q(\cdot|z)) = \{x \in X | q(x|z) > 0\}$ for any latent state z.

Lastly, the agent chooses actions using a policy $\pi$: $X \to \Delta(\mathbb{A})$.

AC-State can use a model referred to as deterministic Ex-BMDP.

Definition 1 (Deterministic Ex-BMDP). A deterministic Ex-BMDP is a BMDP such that the latent state can be decoupled into two parts $z = (s, e)$ where $s \in S$ is the controllable state and $e \in \Xi$ is the exogenous state. For z, z'$\in \mathcal{Z}$, a$\in$ A the transition function is decoupled T $(z'|z, \alpha)=T$ (s'|s, $\alpha)T_e(e'|e)$.

The above definition implies that there exists mappings $f_*$: $X \to [S]$ and $f_{*,e}$: $X \to [E]$ from observations to the corresponding controllable and exogenous latent states. Further, E, the cardinality of the exogenous latent state may be arbitrarily large. Observe that there is no consideration to the episodic setting, but only an assumption of access to a single trajectory.

Furthermore, it is assumed that the diameter of the controllable part of the state space is bounded.

Assumption 1 (Bounded Diameter of Controllable State Space). The length of the shortest path between any $z_1 \in S$ to any $z_2 \in S$ is bounded by D.

A structural result of the Ex-BMDP model is now provided. It is said that $\pi$: $X \to \Delta(\mathbb{A})$ is an endogenous policy if it is not a function of the exogenous noise. Formally, for any $x_1$ and $x_2$, if $f_*(x_1)=f_*(x_2)$ then $7(|x)=T((|f_*(x))$.

Denote $\mathbb{P}_\pi(f_*(x')|f_*(x), t)$ as the probability to observe the controllable latent state $s=f_*(x')$ t time steps after observing $s'=f_*(x)$ and following policy $\pi$. The following result shows that, when executing an endogenous policy, the future t time step distribution of the observation process conditioning on any x has a decoupling property. Using this decoupling property it is proven that the controllable state partition is sufficient to represent the action-prediction model.

Proposition 1 (Factorization Property of Endogenous Policy). Assume that $x \sim \mu(x)$ where $\mu$ is some distribution over the observation space and that $\pi$ is an endogenous policy. Then, for any $t \geq 1$ it holds that $$\mathbb{P}_\pi(x'|x,t) = q(x'|f_*(x'), f_{*,e}(x')) \, \mathbb{P} \, \pi f_*(x')|f_*(x),t) \, \mathbb{P} \, (f_{*,e}(x')|f_*(x),t).$$

Observe that the assumptions used are two-fold; that $\pi$ is an endogenous policy, and that the initial distribution $\alpha_t$, time step t=0 is decoupled $\mu_0(s, e) = \mu_0(s)\mu_0(e)$. In this case, the initial observation is conditioned on x. This also implies that the latent state at the initial time step is deterministic, and, hence, the initial distribution is decoupled $\mu_0(s, e)=1\{s=f^*(x)\}1\{e=f_e^*(x)\}$.

The controllable partition is a Bayes' optimal solution. Consider the generative process in which x is sampled from a distribution $\mu$, the agent executes a policy $\pi$ for t time steps and samples x'. Denote $\mathbb{P}_{\pi,\mu}(x, x', t)$ as the joint probability, and $\mathbb{P}_{\pi,\mu}(\alpha|x, x', t)$ as the probability that under this generative process the action upon observing x is $\alpha$. The following result, which builds on Proposition 1, shows that the optimal Bayes solution $\mathbb{P}_{\pi,\mu}(\alpha|x, x', t)$ is equal to $\mathbb{P}_{\pi,\mu}(\alpha|f_*(x), f_*(x'), t)$ for $\mathbb{P}_{\pi,\mu}(x, x', t) > 0$ where $\mathbb{P}_{\pi,\mu}(x, x', t) > 0$ is the probability to sample x.

Proposition 2. Assume that $\pi$ is and endogenous policy. Let $x \sim \mu$ for some distribution $\mu$. Then, the Bayes' optimal predictor of the action-prediction model is piece-wise constant with respect to the controllable partition: for all $\alpha \in \mathbb{A}$, $t>0$ and x, x'$\in$ X such that $\mathbb{P}_{\pi,\mu}(x, x', t)>0$ it holds that $\mathbb{P}_{\pi,\mu}(\alpha|x, x', t) = \mathbb{P}_{\pi,\mu}(\alpha|f_*(x), f_*(x'), t)$.

The condition $\mathbb{P}_{\pi,\mu}(x, x', t)>0$ is necessary since, otherwise, the conditional probability $\mathbb{P}_{\pi,\mu}(x, x', t)>0$ is not well defined. Proposition 2 is proven via the factorization of the future observation distribution to controllable and exogenous parts that holds when the executed policy does not depend on the exogenous state (Proposition 1).

Proof. The proof follows by applying Bayes' theorem, Proposition (1), and eliminating terms from the numerator and denominator.

Fix any t>0, x, x'$\in$ X and $\alpha \in \mathbb{A}$ such that $\mathbb{P}_{\pi,\mu}(x, x', t)>0$. The following relations hold.

$$\mathbb{P}_{\pi,\mu}(a|x, x', t) \stackrel{(a)}{=} \mathbb{P}_{\pi,\mu}(x'|x, a, t) \frac{\mathbb{P}_{\pi,\mu}(a|x)}{\sum_{a'} \mathbb{P}_{\pi,\mu}(x'|x, a, t)}$$

$$\stackrel{(b)}{=} \mathbb{P}_{\pi,\mu}(x'|x, a, t) \frac{\pi(a|f_*(x))}{\sum_{a'} \mathbb{P}_{\pi,\mu}(x'|x, a', t)\pi(a'|f_*(x))}$$

$$\stackrel{(c)}{=} q(x'|f_*(x'), |f_{*,e}(x'))\mathbb{P}_{\pi,\mu}(f_*(x')|f_*(x), a, t)$$

$$\mathbb{P}_{\pi,\mu}(f_{*,e}(x')|f_{*,e}(x), t)\pi(a|f_*(x))/$$

$$\sum_{a'} q(x'|f_*(x'), |f_{*,e}(x'))\mathbb{P}_{\pi,\mu}(f_*(x')|f_*(x), a', t)$$

$$\mathbb{P}_{\pi,\mu}(f_{*,e}(x')|f_*(x), t)\pi(a'|f_*(x))$$

$$= \mathbb{P}_{\pi,\mu}(f_*(x')|f_*(x), a, t)\pi(a|f_*(x))/$$

$$\sum_{a'} \mathbb{P}_{\pi,\mu}(f_*(x')|f_*(x), a', t)\pi(a'|f_*(x))$$

Relation (a) holds by Bayes' theorem. Relation (b) holds by the assumption that $\pi$ is endogenous. Relation (c) holds by Proposition (1). Thus, $\mathbb{P}(\alpha|x, x', t) = \mathbb{P}_{\pi,\mu}(\alpha|f(x), f_*(x'), t)$ and is constant upon changing the observation while fixing the controllable latent state.

The coarsest partition is the controllable state partition. Proposition 2 shows that the multi-step action-prediction model is piece-wise constant with respect to the partition induced by the controllable states $f_*$: $X \to [S]$.

In this section, it is assumed that the executed policy is an endogenous policy that induces sufficient exploration. With this assumption, it is proven that there is no coarser partition of the observation space such that the set of inverse models are piecewise constant with respect to it.

The following assumptions on the policy by which the data is collected are made.

Assumption 2. Let $T_D$ (s'|s) be the Markov chain induced on the controllable state space by executing the policy $\pi_D$ by which AC-State collects the data.

1. The Markov chain $T_D$ has a stationary distribution $\mu_D$ such that $\mu_D(s, \alpha) > 0$ and $\pi_D(\alpha|s) \geq \pi_{min}$ for all $s \in S$ and $\alpha \in \mathbb{A}$.
2. The policy $\pi_D$ by which the data is collected reaches all accessible states from any states. For any s, s'$\in$ S and any h>0 if s' is reachable from s then $\mathbb{P}_D(s'|s, h) > 0$.
3. The policy $\pi_D$ does not depend on the exogenous state, and is an endogenous policy.

See D. A. Levin, Y. Peres, *Markov chains and mixing times*, vol. 107 (American Mathematical Soc., 2017), Chapter 1, for further discussion on the classes of Markov chains for which the assumption on the stationary distribution hold. The second and third clauses of assumption 2 are satisfied for the random policy that simply executes random actions.

Consider the stochastic process in which an observation is sampled from a distribution $\mu$ such that $\mu(s) = \mu_D(s)$ for all s. Then, the agent executes the policy $\pi_D$ for t time steps. For brevity, we denote the probability measure induced by this process as $\mathbb{P}_D$.

Begin by defining several useful notions. Denote the set of reachable controllable states from s in h time steps as $\mathcal{R}_h(s)$.

Definition 2 (Reachable Controllable States). Let the set of reachable controllable states from $s \in S$ in h>0 time steps be R(s, h)={s'|$\max_\pi$ $P_\pi$(s'|s, h)=1}.

Observe that every reachable state from s in h time steps satisfies that $\max_\pi P_\pi(s'|s_0=s, h) = 1$ due to the deterministic assumption of the controllable dynamics.

Next, define a notion of consistent partition with respect to a set of function values. Intuitively, a partition of space X is consistent with a set of function values if the function is piece-wise constant on that partition.

Definition 3 (Consistent Partition with respect to G). Consider a set $\}_{y,y' \in Y, a \in \mathbb{A}} G = \{g(\alpha, y, y')\}_{y,y' \in Y, a \in \mathbb{A}}$ where g: $\mathbb{A} \times Y \times Y \rightarrow [0, 1]$. Denote f: $Y \rightarrow [N]$ is a consistent partition with respect to g if for all y, $y_1'$, $y_2' \in Y$, f(y)=f($y_2'$) implies that g ($\alpha$, y, $y_1'$)=g ($\alpha$, y, $y_2'$) for all $\alpha \in \mathbb{A}$.

Observe that Proposition 2 shows that the partition of X according to $f_*$ is consistent with respect to { $\mathbb{P}_D(\alpha|x, x', h)|x, x' \in X, h \in [H]$ s.t. $\mathbb{P}_D(x, x', h) > 0$}, since, by Proposition 2, $\mathbb{P}_D(\alpha|x, x', h) = \mathbb{P}_D(\alpha|f_*(x), f_*(x'), h)$.

Towards establishing that the coarsest abstraction according to the AC-State objective is $f_*$, consider the following definition.

Definition 4 (The Generalized Inverse Dynamics Set AC(s, h)). Let $s \in S$, $h \in \mathbb{N}$. Denote AC(s, h) as the set of multi-step inverse models accessible N from s in h time steps. Formally, AC(s, h)={ $\mathbb{P}_D$ ($\alpha$|s', s", h'): s'$\in \mathcal{R}$(s, h–h'), s"$\in \mathcal{R}$(s', h'), $\alpha \in \mathbb{A}$, h'$\in$[h]}. Equation 4.

Observe that in equation 4, the inverse function $\mathbb{P}_D(\alpha|s', s", h')$ is always well defined since $\mathbb{P}_D(s', s", h') > 0$. It holds that $\mathbb{P}_D(s', s", h')$ $\mathbb{P}_D(s)_D$ (S" s', h')>0, since $\mathbb{P}_D(s')>0$ and $\mathbb{P}_D$ (s"|s, h')>0. The inequality $\mathbb{P}_D(s')>0$ holds by the assumption that the stationary distribution when following U has positive support on all controllable states (Assumption 2). The inequality $\mathbb{P}_D$ (s"|s', h')>0 holds since, by definition s"$\in \mathcal{R}(s', h')$, is reachable from s' in h' time steps; hence, $\mathbb{P}_D$ (s"|s, h')>0 by the fact that Assumption 2 implies that the policy $\pi_D$ induces sufficient exploration.

Theorem ($f_*$ is the coarsest partition consistent with AC-State objective). Assume assumptions 1 and 2 holds. Then there is no coarser partition than $f_*$ which is consistent with AC(s, D) for any $s \in S$.

Proof. Show inductively that for any h>0 and $s \in S$ there is no coarser partition than $\mathcal{R}(s, h)$ for the set $\mathcal{R}(s, h)$ that is consistent with AC(s, h). Since the set of reachable states in h=D time steps is S—all states are reachable from any state in D time steps—it will directly imply that there is no coarser partition than $\mathcal{R}(s, D) = S$ consistent with AC(s, D).

Base case, h=1. Assume that h=1 and fix some $s \in S$. Since the controllable dynamics are deterministic, there are A reachable states from s. Observe the inverse dynamics for any s'$\in \mathcal{R}(s, 1)$ satisfies that $$P_D(a|s, s', 1) = \begin{cases} 1 & \text{if } a \text{ leads } s' \text{ from } s \\ 0 & \text{otherwise} \end{cases} \quad \text{Equation 5}$$

This can be proved by an application of Bayes' rule:

$$\mathbb{P}_D(a|s, s', 1) = \frac{\mathbb{P}_D(s'|s = s, a, 1)\pi_D(a|s)}{\sum_{a'} \mathbb{P}_D(s'|s = s, a', 1)\pi_D(a'|s)}$$

$$= \frac{\mathcal{T}(s'|s, a)\pi_D(a|s)}{\sum_{a'} \mathcal{T}(s'|s, a')\pi_D(a'|s)}$$

$$\begin{cases} \geq \pi_{min}(s, a) \text{leads to } s' \\ = 0 \text{ otherwise} \end{cases}$$

where the last relation holds by Assumption 2. Furthermore, observe that since s'$\in \mathcal{R}(s, 1)$, i.e., it is reachable from s, the probability function $\mathbb{P}_D$ (s, s', 1) is well defined.

Hence, by Equation 5, for any $s'_1, s'_2 \in \mathcal{R}(s, 1)$ such that $s'_1 \neq s'_2$ it holds that there exists $\alpha \in A$ such that $\pi_{min} \geq \mathbb{P}_D(\alpha|s, s'_1, 1) \neq \mathbb{P}_D(\alpha|s, s'_2, 1) = 0$ Specifically, choose a such that taking a from s leads to s' and see that, by equation 5, $\pi_{min} \geq \mathbb{P}_D(\alpha|s, s'_1, 1) \neq \mathbb{P}_D(\alpha|s, s'_2, 1) = 0$.

Lastly, by the fact that $s \in S$ is an arbitrary state, the induction base case is proved for all $s \in S$.

Induction step. Assume the induction claim holds for all $t \in [h]$ where $h \in N$. It holds for $t = h+1$. Fix some $s \in S$. The induction step is proved to show that $\mathcal{R}(s, h+1)$ is the coarsest partition which is consistent AC(s, h+1). Meaning, there exists $\tilde{s}$, $t \in [h+1]$, $\alpha$ such that $\mathbb{P}(\alpha|\tilde{s}, s'_1, 1)$, $\mathbb{P}(\alpha|\tilde{s}, s'_2, 1) \in AC(\tilde{s}, h+1)$ and $\mathbb{P}(\alpha|\tilde{s}, s'_1, t) \neq \mathbb{P}(\alpha|\tilde{s}, s'_2, t)$.

Observe that, by Definition 4, it holds that, $AC(s,h) = \{\mathbb{P}(\alpha|s, s', h+1)\}_{s' \in \mathcal{R}(s,h+1)} \cup_{\tilde{s} \in \mathcal{R}(s,1)} AC(\tilde{s},h)$ Meaning, the set AC(s, h+1) can be written as the union of (1) the set $\{\mathbb{P}_D(\alpha|s, s', h+1)\}_{s' \in \mathcal{R}(s,h+1)}$, and (2) the union of the sets AC($\tilde{s}$, h) for all s which is reachable from s in a single time step.

By the induction hypothesis, the coarsest partition which is consistent with AC($\tilde{s}$, h) is $\cup_{h',1}^{h} \mathcal{R}(s, h')$. One only needs to prove, that for any $\overline{s_1}, \overline{s_2} \in \mathcal{R}(s, h+1)$ such that $\overline{s_1} \neq \overline{s_2}$ there exists some $\alpha \in A$, h' E[h] and $s_h \in \mathcal{R}(s, h+1)$ such that $\mathbb{P}_D(\alpha|s_{h'}, \overline{s_1}, h') \neq \mathbb{P}_D(\alpha|s_{h'}, \overline{s_2}, h')$ this will imply that the set of reachable states in h+1 time states is also the coarsest partition which is consistent with AC(s, h+1).

Fix $\overline{s_1}, \overline{s_2} \in \mathcal{R}(s, h+1)$ such that $\overline{s_1} \neq \overline{s_2}$ we show that exists a certificate in AC(s, h+1) that differentiate between the two by considering three cases.

1. Case 1: Both $\overline{s_1}$ and $\overline{s_2}$ are reachable from all s'$\in \mathcal{R}(s, 1)$. In this case, for all s'$\in \mathcal{R}(s, 1)$ it holds that $\overline{s_1}, \overline{s_2} \in$ $\mathcal{R}$(s', h). By the induction hypothesis, $\overline{s_1}$ and $\overline{s_2}$ cannot be merged while being consistent with AC(s', h).

2. Case 2: Exists s'∈R(s, 1) such that $\overline{s_1}$ is reachable from s' in h time steps and $\overline{s_2}$ is not. Let a be the action that leads to s' from state s. In that case, it holds by the third assumption of Assumption 2 that $$\mathbb{P}_D(a|s, \overline{s_1}, h+1) =^{(a)} \frac{\mathbb{P}_D(\overline{s_1}|s, a, h+1)\pi_D(a|s)}{\sum_{a'}\mathbb{P}_D(\overline{s_1}|s, a', h+1)\pi_D(a'|s)} =$$

$$^{(b)} \frac{\mathbb{P}_D(\overline{s_1}|s', h)\pi_D(a|s)}{\sum_{a'}\mathbb{P}_D(\overline{s_1}|s, a', h+1)\pi_D(a'|s)} \geq$$

$$^{(c)}\pi_{min} \frac{\mathbb{P}_D(\overline{s_1}|s', h)}{\sum_{a'}\mathbb{P}_D(\overline{s_1}|s, a', h+1)} \geq^{(d)} 0.$$

Equation 7

Relation (α) holds by Bayes' rule. Relation (b) holds by the fact that (s, α) deterministically leads to s'. Relation (c) and (d) hold by Assumption 2. Observe that $\mathbb{P}_D(\alpha|s, s_2, h+1)=0$ since $\overline{s_2}$ is not reachable upon taking action α from state s, by the assumption. Combining this fact with equation (7) implies that $$0 < \mathbb{P}_D(\alpha|s,\overline{s_1},h+1) \neq \mathbb{P}_D(\alpha|s,\overline{s_2},h+1) = 0$$

Hence, there exists a certificate that differentiates between $\overline{s_1}$ and $\overline{s_2}$. Observe that since $\overline{s_2}\in \mathcal{R}$(s, h+1), i.e., it is reachable from s, it holds that $\mathbb{P}_D(\alpha|s, \overline{s_2}, h+1)=0$, i.e., it is well defined.

3. Case 3: There exists s'∈ $\mathcal{R}$(s, 1) such that $\overline{s_2}$ is reachable from s' in h time steps and $\overline{s_1}$ is not. This case is symmetric to case 2.

This establishes the result shown in equation 6 and, hence, the induction and result holds.

Reinforcement Learning with Rewards

The theory discussed the case where it is desired to learn a representation f(x) in the absence of reward or other supervision. If the reward is only a function of the controllable latent state, then the f(x) learned with AC-State is fully sufficient for reinforcement learning using that reward signal. If the reward depends on both the controllable latent state and the exogenous noise, but with an additive relationship, then AC-State is sufficient for learning the optimal policy but may lead to incorrect learning of the value function. In the case where the reward depends on both the controllable latent state and exogenous noise, with a non-linear interaction, then AC-State can be modified to have f($x_t$) also predict rewards. Intuitively, if one thinks about the robot-arm control problem with a distracting background TV, and consider a case where the reward is given when the robot is to the left and the TV shows a specific frame. In this case, the controllable latent state needs to be made less coarse to also capture the reward information in its latent state. At the same time, learning from rewards is insufficient for learning the controllable latent state, as one could imagine a setting where two controllable latent states are equivalent from the perspective of the value function yet are distinct states.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as object recognition, device behavior modeling (as in the present application) or the like. The encoder 108, action predictor 112, or other component or operation of the system 100, system 200, or method 300 can include or be implemented using one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN-here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 10:
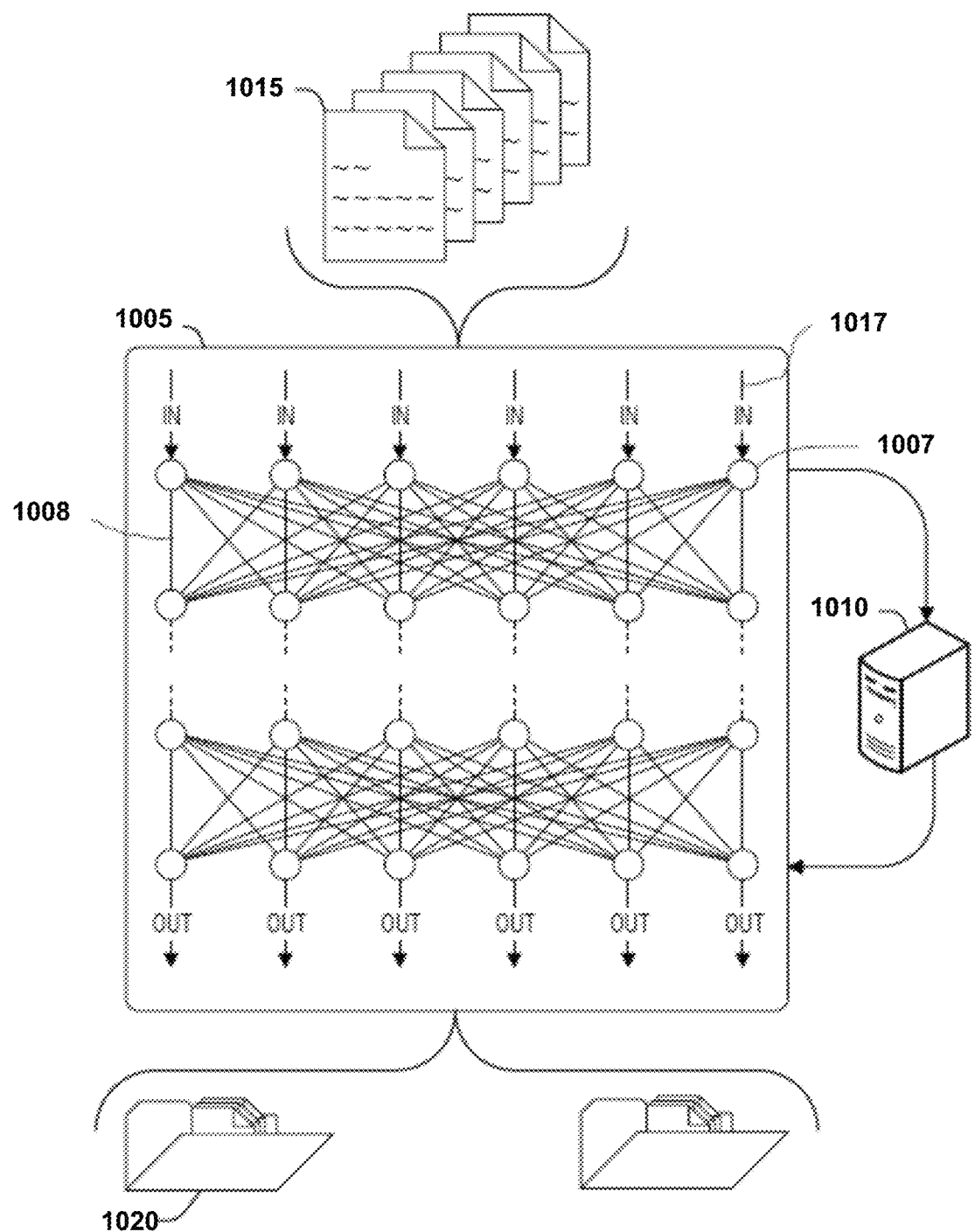
FIG. 10 is a block diagram of an example of an environment including a system for neural network training.

FIG. 10 is a block diagram of an example of an environment including a system for neural network training. The system includes an artificial NN (ANN) 1005 that is trained using a processing node 1010. The processing node 1010 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 1005, or even different nodes 1007 within layers. Thus, a set of processing nodes 1010 is arranged to perform the training of the ANN 1005.

The set of processing nodes 1010 is arranged to receive a training set 1015 for the ANN 1005. The ANN 1005 comprises a set of nodes 1007 arranged in layers (illustrated as rows of nodes 1007) and a set of inter-node weights 1008 (e.g., parameters) between nodes in the set of nodes. In an example, the training set 1015 is a subset of a complete training set. Here, the subset may enable processing nodes with limited storage resources to participate in training the ANN 1005.

The training data may include multiple numerical values representative of a domain, such as an image feature, or the like. Each value of the training or input 1017 to be classified after ANN 1005 is trained, is provided to a corresponding node 1007 in the first layer or input layer of ANN 1005. The values propagate through the layers and are changed by the objective function.

As noted, the set of processing nodes is arranged to train the neural network to create a trained neural network. After the ANN is trained, data input into the ANN will produce valid classifications 1020 (e.g., the input data 1017 will be assigned into categories), for example. The training performed by the set of processing nodes 1007 is iterative. In an example, each iteration of the training the ANN 1005 is performed independently between layers of the ANN 1005. Thus, two distinct layers may be processed in parallel by different members of the set of processing nodes. In an example, different layers of the ANN 1005 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 1007 (e.g., neurons) are trained independently. In an example, the nodes are trained on different hardware.

Figure 11:
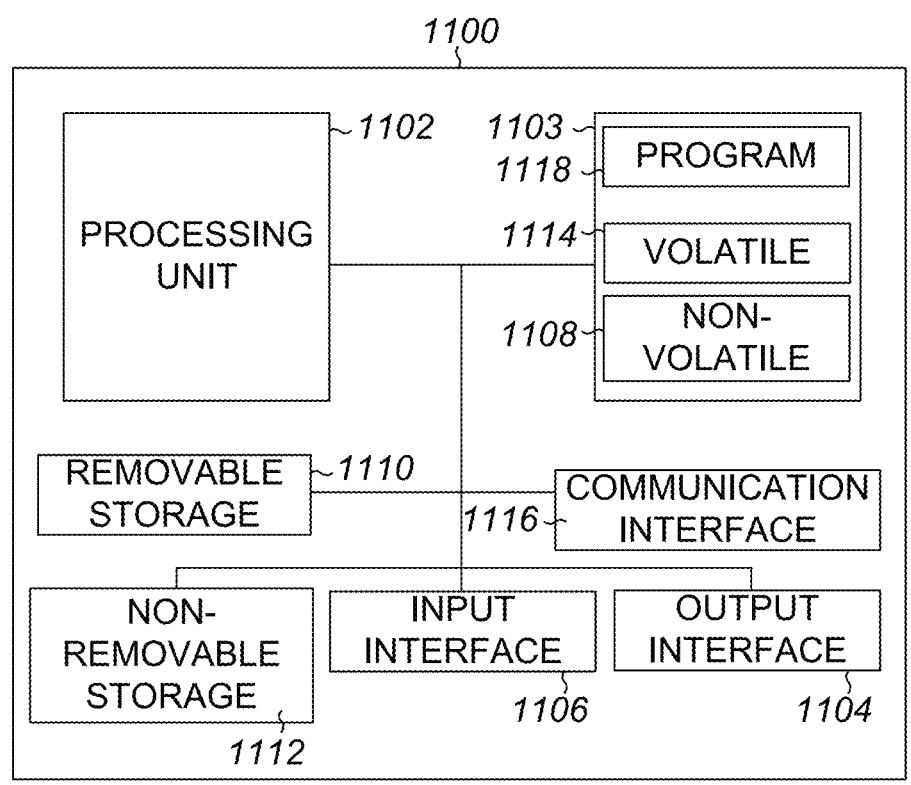
FIG. 11 illustrates, by way of example, a block diagram of an embodiment of a machine (e.g., a computer system) to implement one or more embodiments.

FIG. 11 illustrates, by way of example, a block diagram of an embodiment of a machine 1100 (e.g., a computer system) to implement one or more embodiments. One or more of the encoder 108, hidden state focus operation 132, action predictor 112, loss operator 110, sensor 104, agent 102, method 300, or a component or operations thereof can be implemented, at least in part, using a component of the machine 1100. One example machine 1100 (in the form of a computer), may include a processing unit 1102, memory 1103, removable storage 1110, and non-removable storage 1112. Although the example computing device is illustrated and described as machine 1100, the computing device may be in different forms in different embodiments. For example, the computing device may instead be a smartphone, a tablet, smartwatch, or other computing device including the same or similar elements as illustrated and described regarding FIG. 11. Devices such as smartphones, tablets, and smartwatches are generally collectively referred to as mobile devices. Further, although the various data storage elements are illustrated as part of the machine 1100, the storage may also or alternatively include cloud-based storage accessible via a network, such as the Internet.

Memory 1103 may include volatile memory 1114 and non-volatile memory 1108. The machine 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1100 may include or have access to a computing environment that includes input 1106, output 1104, and a communication connection 1116. Output 1104 may include a display device, such as a touchscreen, that also may serve as an input component. The input 1106 may include one or more of a touchscreen, touchpad, mouse, keyboard, camera, one or more device-specific buttons, one or more sensors integrated within or coupled via wired or wireless data connections to the machine 1100, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1102 (sometimes called processing circuitry) of the machine 1100. A hard drive, CD-ROM, and RAM are some examples of articles including a non-transitory computer-readable medium such as a storage device. For example, a computer program 1118 may be used to cause processing unit 1102 to perform one or more methods or algorithms described herein.

Additional Notes and Examples

Example 1 includes a method for control state learning, the method comprising receiving a first observation of a temporal series of observations produced by a sensor and a second observation of the temporal series of observations, the second observation separated from the first observation in the temporal series of observations by more than one other observation, the first observation associated with a first action performed by an agent responsive to the first observation, encoding, by a neural network (NN) encoder, the first observation and the second observation into respective first and second hidden state representations, combining the first and second hidden state representations resulting in a combined hidden state representation, operating, by an action predictor, on the combined hidden state representation resulting in a second action, and altering weights of the encoder and the action predictor based on a difference between the first action and the second action.

In Example 2, Example 1 further includes altering the hidden state representation to remove information irrelevant to control of the agent resulting in a focused hidden state representation and wherein the action predictor operates on the focused hidden state representation.

In Example 3, Example 2 further includes, wherein altering the hidden state representation includes using a Gaussian variational information bottleneck, vector quantization, or a combination thereof.

In Example 4, Example 3 further includes, wherein altering the hidden state representation includes using the Gaussian variational information bottleneck and the vector quantization to generate the focused hidden state representation.

In Example 5, at least one of Examples 1-4 further includes, wherein altering the weights includes using an objective function that operates based on the first action, the first observation, and the second observation to determine a probability.

In Example 6, at least one of Examples 1-5 further includes receiving a value, k, indicating a difference between a first index of the first observation and a second index of the second observation in the temporal series of observations.

In Example 7, Example 6 further includes between consecutive training iterations, altering k to a different integer.

In Example 8, Example 7 further includes, wherein k is an integer between one and a maximum path length of a Markov decision process that models behavior of the agent.

In Example 9, at least one of Examples 1-8 further includes, wherein the first and the second actions are movements of a robot.

In Example 10, at least one of Examples 1-9 further includes, wherein the first and second actions are operations of an agent with a controllable latent state among a plurality of agents that do not have a controllable latent state.

In Example 11, at least one of Examples 1-10 further includes, wherein the first and second actions are movements of an agent within a navigable environment.

Example 12 includes a system for control state learning, the system comprising a neural network (NN) encoder configured to receive a first observation of a temporal series of observations produced by a sensor and a second observation of the temporal series of observations, the second observation separated from the first observation in the temporal series of observations by more than one other observation, the first observation associated with a first action performed by an agent responsive to the first observation, and encode the first observation and the second observation into respective first and second hidden state representations, a hidden state focus configured to combine the first and second hidden state representations resulting in a combined hidden state representation, an action predictor configured to operate on the combined hidden state representation resulting in a second action, and a loss operator configured to alter weights of the encoder and the action predictor based on a difference between the first action and the second action.

In Example 13, Example 12 further includes, wherein the hidden state focus is further configured to alter the hidden state representation to remove information irrelevant to control of the agent resulting in a focused hidden state representation and wherein the action predictor operates on the focused hidden state representation.

In Example 14, Example 13 further includes, wherein altering the hidden state representation includes using a Gaussian variational information bottleneck, vector quantization, or a combination thereof.

In Example 15, at least one of Examples 12-14 further includes a trainer configured to receive a value, k, indicating a difference between a first index of the first observation and a second index of the second observation in the temporal series of observations, and between consecutive training iterations, altering k to a different integer between one and a maximum path length of a Markov decision process that models behavior of the agent.

Example 16 includes a (e.g., non-transitory) machine-readable medium including instructions that, when executed by a machine, cause the machine to perform operations for control state learning, the operations comprising receiving a first observation of a temporal series of observations produced by a sensor and a second observation of the temporal series of observations, the second observation separated from the first observation in the temporal series of observations by more than one other observation, the first observation associated with a first action performed by an agent responsive to the first observation, encoding, by a neural network (NN) encoder, the first observation and the second observation into respective first and second hidden state representations, combining the first and second hidden state representations resulting in a combined hidden state representation, operating, by an action predictor, on the combined hidden state representation resulting in a second action, and altering weights of the encoder and the action predictor based on a difference between the first action and the second action.

In Example 17, Example 16 further includes, wherein the operations further comprise receiving a value, k, indicating a difference between a first index of the first observation and a second index of the second observation in the temporal series of observations, between consecutive training iterations, altering k to a different integer, wherein k is an integer between one and a maximum path length of a Markov decision process that models behavior of the agent.

In example 18, at least one of Examples 16-17 further includes, wherein the first and the second actions are movements of a robot.

In Example 19, at least one of Examples 16-18 further includes, wherein the first and second actions are operations of an agent with a controllable latent state among a plurality of agents that do not have a controllable latent state.

In Example 20, at least one of Examples 16-19 further includes, wherein the first and second actions are movements of an agent within a navigable environment.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

Although a few embodiments have been described in detail above, other modifications are possible. For example, the logic flows depicted in the figures do not require the order shown, or sequential order, to achieve desirable results. The desirable for embodiments can include the user having confidence in the state of their data, settings, controls, and secrets before, during, and after a migration to a new version of an application. Using multiple factors to check data state, integrity, presence, and absence before and after the migration can increase confidence. Other steps may be provided, or steps may be eliminated, from the described flows, and other components may be added to, or removed from, the described systems. Other embodiments may be within the scope of the following claims.

What is claimed is:

1. A method for control state learning, the method comprising:
    receiving a first observation of a temporal series of observations produced by a sensor and a second observation of the temporal series of observations, the second observation separated from the first observation in the temporal series of observations by more than one other observation, the first observation associated with a first action performed by an agent responsive to the first observation, the first observation at a first time, the second observation at a second time after the first time, and the other observation at a time between the first and second times;
    encoding, by a neural network (NN) encoder, the first observation and the second observation into respective first and second hidden state representations;
    combining the first and second hidden state representations resulting in a combined hidden state representation;
    operating, by an action predictor, on the combined hidden state representation resulting in a second action, the second action a prediction of the action to be taken by the agent responsive to the second observation; and
    altering weights of the encoder and the action predictor based on a difference between the first action and the second action resulting in an updated encoder and an updated action predictor; and
    operating a second agent, using the updated encoder and the updated action predictor, to perform additional actions based on further observations.

2. The method of claim 1, further comprising:
    altering the hidden state representation to remove information irrelevant to control of the agent resulting in a focused hidden state representation and wherein the action predictor operates on the focused hidden state representation.

3. The method of claim 2, wherein altering the hidden state representation includes using a Gaussian variational information bottleneck, vector quantization, or a combination thereof.

4. The method of claim 3, wherein altering the hidden state representation includes using the Gaussian variational information bottleneck and the vector quantization to generate the focused hidden state representation.

5. The method of claim 1, wherein altering the weights includes using an objective function that operates based on the first action, the first observation, the second observation to determine a probability, and a value indicating a difference between a first index of the first observation and a second index of the second observation in the temporal series of observations to determine a probability, the difference greater than one.

6. The method of claim 1, further comprising:
    receiving a value, k, indicating a difference between a first index of the first observation and a second index of the second observation in the temporal series of observations.

7. The method of claim 6, further comprising:
    between consecutive training iterations, altering k to a different number.

8. The method of claim 7, wherein k is a number between one and a maximum path length of a Markov decision process that models behavior of the agent.

9. The method of claim 1, wherein the first and the second actions are movements of a robot.

10. The method of claim 1, wherein the first and second actions are operations of an agent with a controllable latent state among a plurality of agents that do not have a controllable latent state.

11. The method of claim 1, wherein the first and second actions are movements of an agent within a navigable environment.

12. A system for control state learning, the system comprising:
    a neural network (NN) encoder configured to:
        receive a first observation of a temporal series of observations produced by a sensor and a second observation of the temporal series of observations, the second observation separated from the first observation in the temporal series of observations by more than one other observation, the first observation associated with a first action performed by an agent responsive to the first observation, the first observation at a first time, the second observation at a second time after the first time, and the other observation at a time between the first and second times; and
        encode the first observation and the second observation into respective first and second hidden state representations;
    a hidden state focus configured to combine the first and second hidden state representations resulting in a combined hidden state representation;
    an action predictor configured to operate on the combined hidden state representation resulting in a second action, the second action a prediction of the action to be taken by the agent responsive to the second observation;
    a loss operator configured to alter weights of the encoder and the action predictor based on a difference between the first action and the second action resulting in an updated encoder and an updated action predictor; and
    processing circuitry configured to operate, using the updated encoder and the updated action predictor, a second agent to perform additional actions based on further observations.

13. The system of claim 12, wherein the hidden state focus is further configured to alter the hidden state representation to remove information irrelevant to control of the agent resulting in a focused hidden state representation and wherein the action predictor operates on the focused hidden state representation.

14. The system of claim 13, wherein altering the hidden state representation includes using a Gaussian variational information bottleneck, vector quantization, or a combination thereof.

15. The system of claim 12, further comprising:
a trainer configured to receive a value, k, indicating a difference between a first index of the first observation and a second index of the second observation in the temporal series of observations; and
between consecutive training iterations, altering k to a different number between one and a maximum path length of a Markov decision process that models behavior of the agent.

16. A non-transitory machine-readable medium including instructions that, when executed by a machine, cause the machine to perform operations for control state learning, the operations comprising:
receiving a first observation of a temporal series of observations produced by a sensor and a second observation of the temporal series of observations, the second observation separated from the first observation in the temporal series of observations by more than one other observation, the first observation associated with a first action performed by an agent responsive to the first observation;
encoding, by a neural network (NN) encoder, the first observation and the second observation into respective first and second hidden state representations, the first observation at a first time, the second observation at a second time after the first time, and the other observation at a time between the first and second times;
combining the first and second hidden state representations resulting in a combined hidden state representation;
operating, by an action predictor, on the combined hidden state representation resulting in a second action, the second action a prediction of the action to be taken by the agent responsive to the second observation;
altering weights of the encoder and the action predictor based on a difference between the first action and the second action resulting in an updated encoder and an updated action predictor; and
operating a second agent, using the updated encoder and the updated action predictor, to perform additional actions based on further observations.

17. The non-transitory machine-readable medium of claim 16, wherein the operations further comprise:
receiving a value, k, indicating a difference between a first index of the first observation and a second index of the second observation in the temporal series of observations;
between consecutive training iterations, altering k to a different number, wherein k is a number between one and a maximum path length of a Markov decision process that models behavior of the agent.

18. The non-transitory machine-readable medium of claim 16, wherein the first and the second actions are movements of a robot.

19. The non-transitory machine-readable medium of claim 16, wherein the first and second actions are operations of an agent with a controllable latent state among a plurality of agents that do not have a controllable latent state.

20. The non-transitory machine-readable medium of claim 16, wherein the first and second actions are movements of an agent within a navigable environment.

* * * * *